(12) United States Patent
Choi et al.

(10) Patent No.: US 10,140,500 B2
(45) Date of Patent: Nov. 27, 2018

(54) METHOD, APPARATUS, AND SYSTEM FOR RECOGNIZING FINGERPRINT

(71) Applicant: Samsung Electronics Co., Ltd., Suwon-si, Gyeonggi-do (KR)

(72) Inventors: Chang Kyu Choi, Seongnam-si (KR); Wonjun Kim, Hwaseong-si (KR); Sungjoo Suh, Seoul (KR); Byungin Yoo, Seoul (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 93 days.

(21) Appl. No.: 14/933,614

(22) Filed: Nov. 5, 2015

(65) Prior Publication Data
US 2016/0203354 A1  Jul. 14, 2016

(30) Foreign Application Priority Data
Jan. 8, 2015  (KR) .................. 10-2015-0002414

(51) Int. Cl.
*G06K 9/00* (2006.01)
*G06K 9/46* (2006.01)
*G06T 3/60* (2006.01)

(52) U.S. Cl.
CPC ......... *G06K 9/00026* (2013.01); *G06K 9/001* (2013.01); *G06K 9/4642* (2013.01); *G06T 3/60* (2013.01); *G06T 2200/32* (2013.01); *G06T 2207/20021* (2013.01); *G06T 2207/20221* (2013.01)

(58) Field of Classification Search
CPC ... G06K 9/00; G06K 9/00221; G06K 9/00979
See application file for complete search history.

(56) References Cited

U.S. PATENT DOCUMENTS

| | | | |
|---|---|---|---|
| 7,359,533 B2 * | 4/2008 | Moon | G06K 9/00087 382/124 |
| 7,616,787 B2 | 11/2009 | Boshra | |
| 8,059,872 B2 | 11/2011 | Tazoe | |

FOREIGN PATENT DOCUMENTS

| | | |
|---|---|---|
| JP | 2009064262 A | 3/2009 |
| JP | 2010044616 A | 2/2010 |
| KR | 100393753 B1 | 7/2003 |
| KR | 20050010102 A | 1/2005 |
| KR | 20050046925 A | 5/2005 |
| KR | 20100002606 A | 1/2010 |
| KR | 20110022923 A | 3/2011 |
| KR | 20110114191 A | 10/2011 |

* cited by examiner

*Primary Examiner* — Duy M Dang
(74) *Attorney, Agent, or Firm* — Harness, Dickey & Pierce, P.L.C.

(57) ABSTRACT

A fingerprint recognition method includes determining a code corresponding to a query image based on features of blocks in the query image, obtaining information corresponding to the determined code from a lookup table, and verifying the query image based on the obtained information.

12 Claims, 64 Drawing Sheets

LUT

| Code | $t_x$ | $t_y$ | r |
|------|-------|-------|---|
|      |       |       |   |

~32.5 degrees
(Tx=72, Ty=1)

2700

FIG. 31
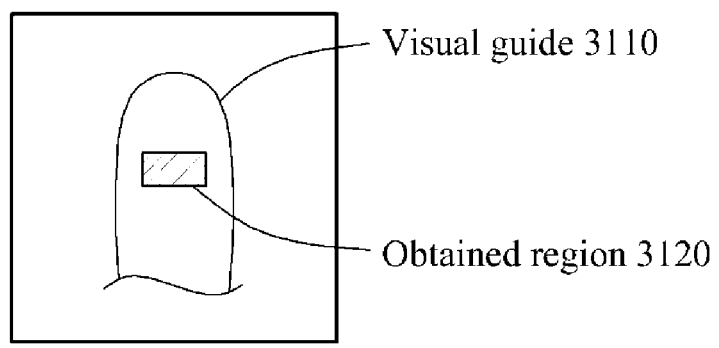
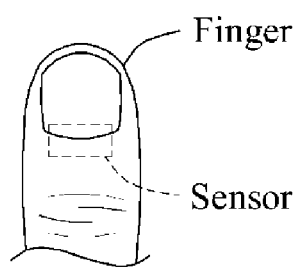

FIG. 32
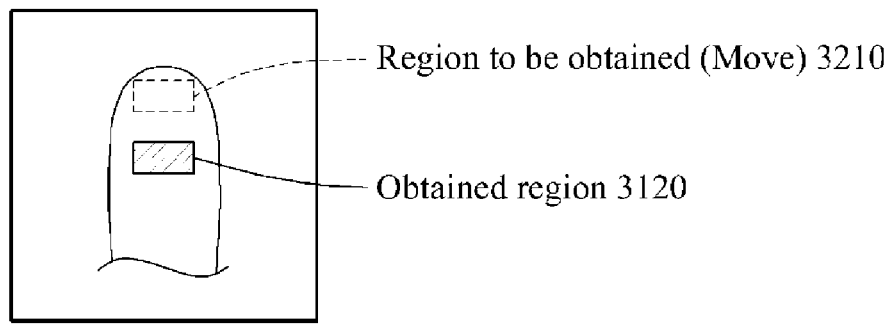
Region to be obtained (Move) 3210
Obtained region 3120
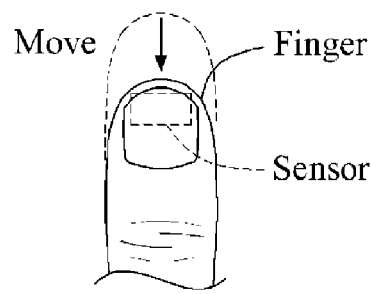
Move — Finger — Sensor

FIG. 33
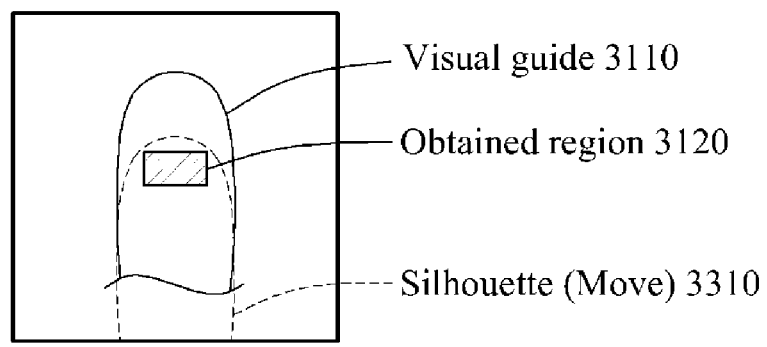
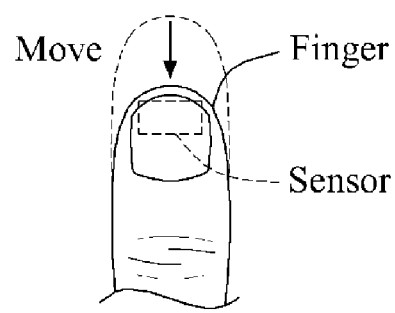

FIG. 34
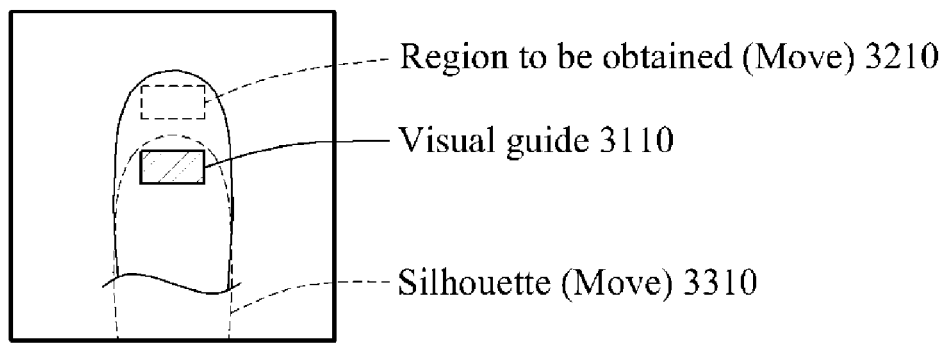
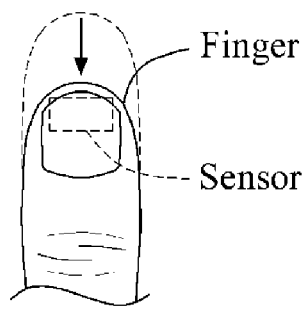

FIG. 35
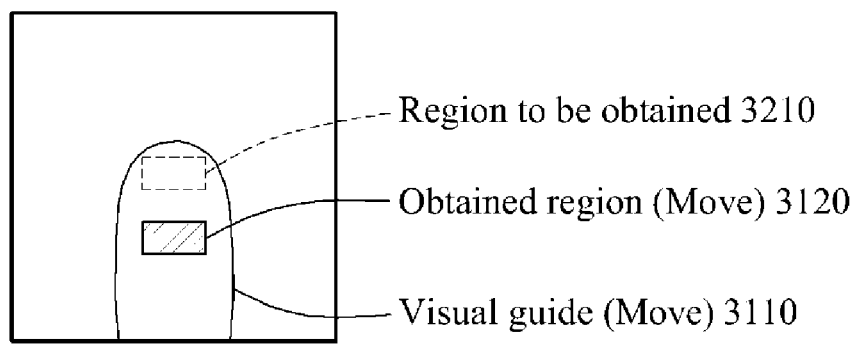
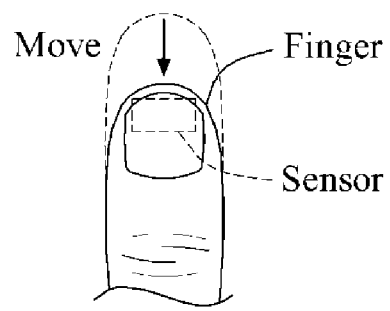

FIG. 38
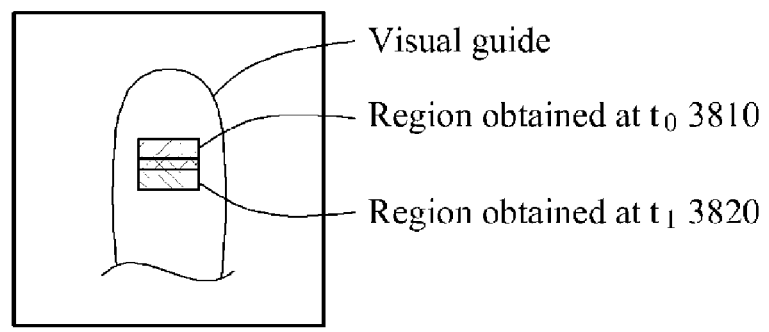
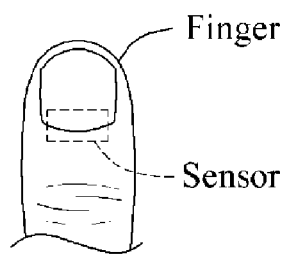

FIG. 39
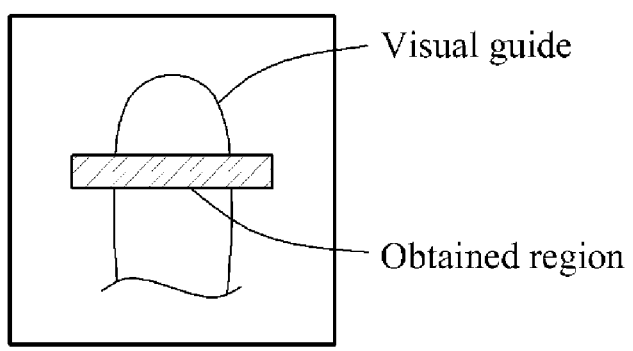
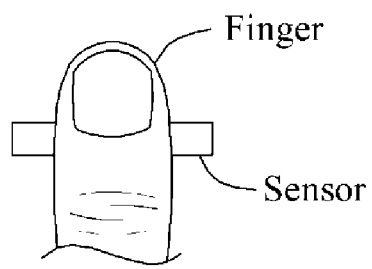

FIG. 40
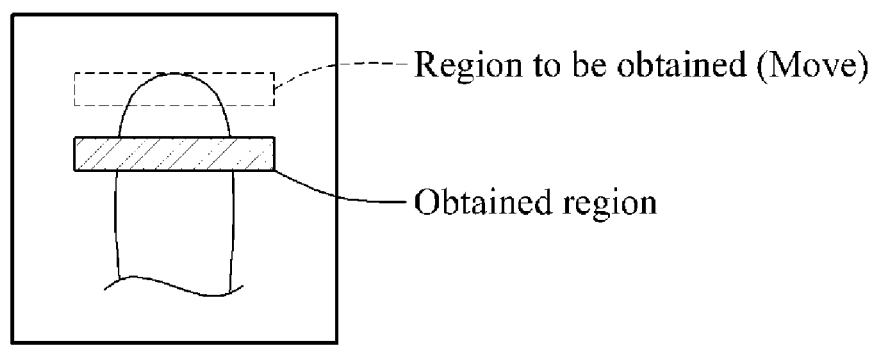
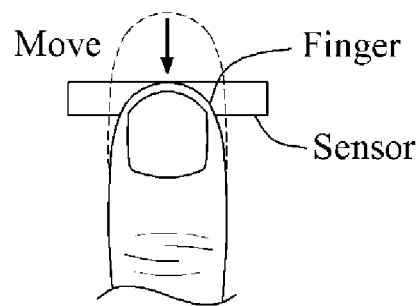

FIG. 41
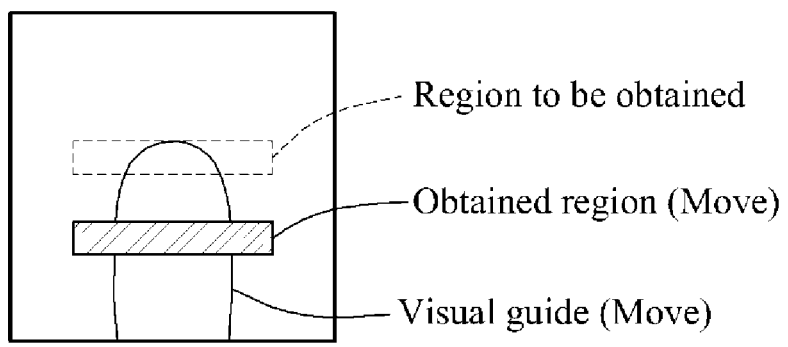
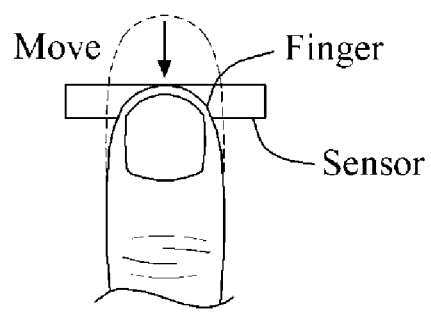

FIG. 42
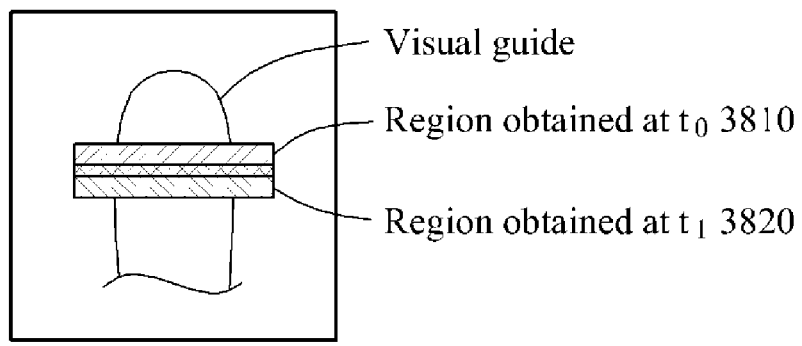
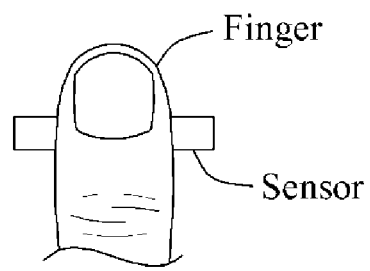

FIG. 43
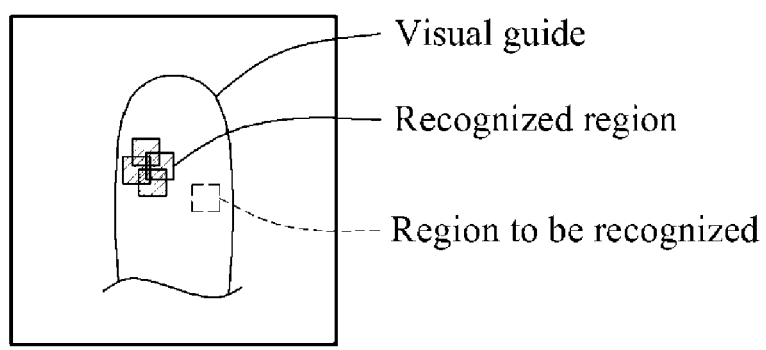
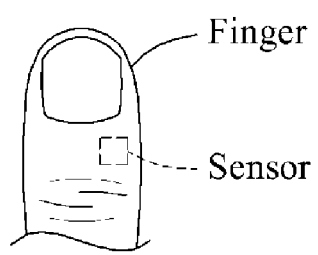

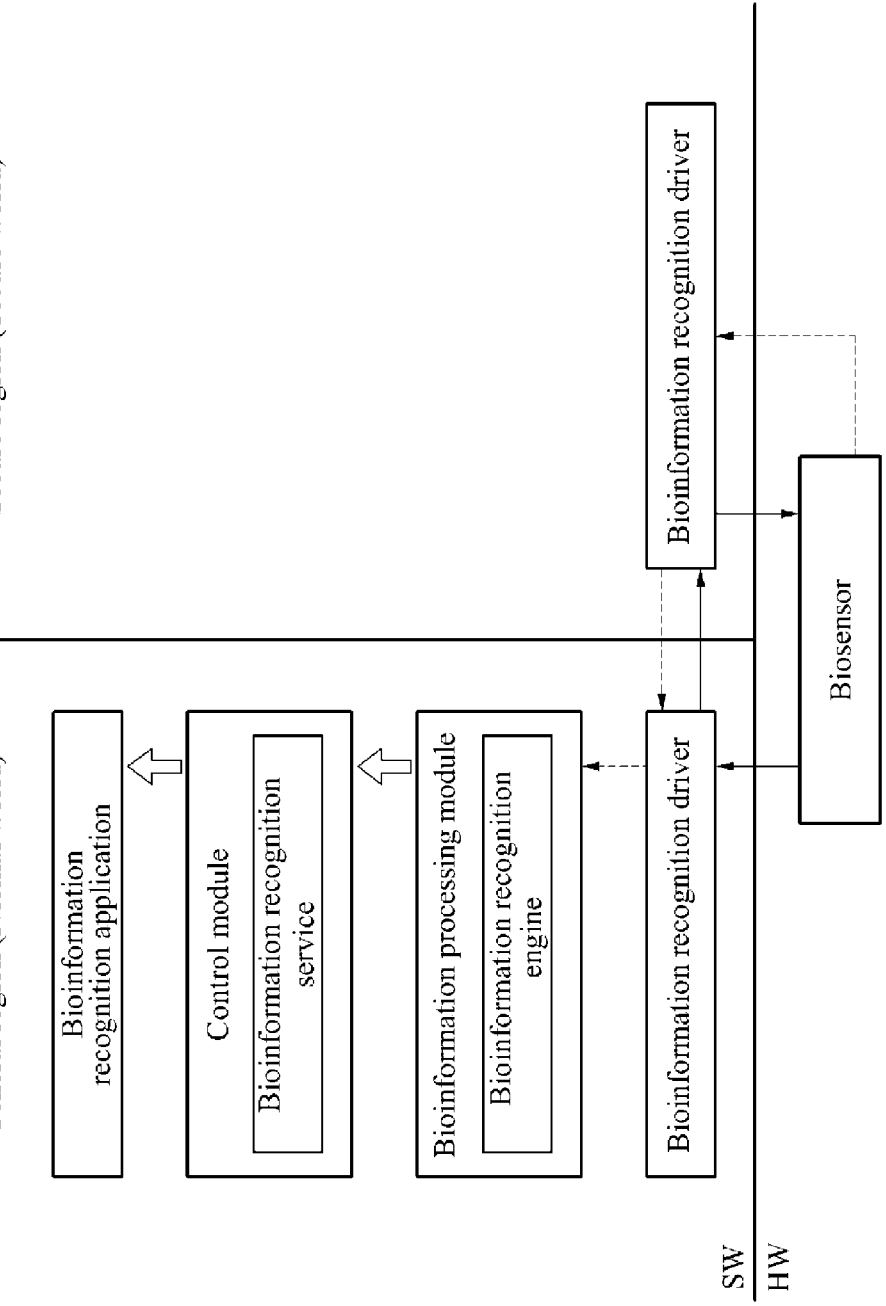

METHOD, APPARATUS, AND SYSTEM FOR RECOGNIZING FINGERPRINT

CROSS-REFERENCE TO RELATED APPLICATION

This application claims the benefit under 35 U.S.C. § 119(a) of Korean Patent Application No. 10-2015-0002414, filed on Jan. 8, 2015, in the Korean Intellectual Property Office, the entire contents of which are incorporated herein by reference for all purposes.

BACKGROUND

1. Field

At least some example embodiments relate to a method, an apparatus, and a system for recognizing a fingerprint.

2. Description of the Related Art

Biometric based authentication technology may perform user authentication using a fingerprint, an iris, a voice, a face, blood vessels, and the like. Such biological characteristics used for the authentication differ from individual to individual, rarely change during a lifetime, and have a low risk of being stolen or copied. In addition, individuals do not need to intentionally carry such characteristics at all times and thus, may not suffer an inconvenience using the biological characteristics.

Currently, a fingerprint recognition method is most commonly used due to a high level of convenience, security, and economic efficiency. User authentication using a fingerprint is initiated by receiving, from a user, a fingerprint image to be registered and used for fingerprint verification and storing the received fingerprint image. When a fingerprint image newly inputted from a user requesting authentication matches the stored fingerprint image, the user may be authenticated as a registered user.

Due to a recent downsizing of portable devices, a size of a fingerprint sensing region included in a portable device has been reduced.

SUMMARY

At least some example embodiments relate to a fingerprint recognition method.

In some example embodiments, the fingerprint recognition method may include receiving a query image, the query image corresponding to at least a portion of a fingerprint, dividing the query image into a plurality of blocks, determining a code corresponding to the query image based on features of the blocks, obtaining information corresponding to the code from a prearranged lookup table, and verifying the query image based on the obtained information corresponding to the code.

At least other example embodiments relate to a method of generating a lookup table.

In some example embodiments, the lookup table generating method may include storing first elements in the lookup by scanning a fingerprint image of a user using a window including a plurality of blocks, rotating the fingerprint image, and storing second elements in the lookup table by scanning the rotated fingerprint image using the window.

At least other example embodiments relate to a stitching method.

In some example embodiments, the stitching method may include calculating a directional coherence of a fingerprint included in each of partial images, arranging the partial images based on the calculated directional coherences, and stitching the partial images based on an order in which the partial images are arranged.

At least other example embodiments relate to a fingerprint verification method.

In some example embodiments, the fingerprint verification method may include receiving a query image for fingerprint recognition, the query image corresponding to at least a portion of a fingerprint, detecting candidate enrolled images overlapping the query image based on minutiae-based first matching, determining transition information and rotation information between the query image and the candidate enrolled images based on pixel information-based second matching, and verifying the query image based on the transition information and the rotation information.

At least other example embodiments relate to a fingerprint enrollment method.

In some example embodiments, the fingerprint enrollment method may include tracking a proximity movement of a finger, and providing a user interface guiding a fingerprint enrollment procedure based on the tracked proximity movement.

At least other example embodiments relate to another fingerprint enrollment method.

In some example embodiments, the fingerprint enrollment method may include receiving a fingerprint from a plurality of views, receiving the fingerprint from a plurality of angles, and receiving the fingerprint based on a combination of the views and the angles.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 31 through 43 illustrate a visual guide according to example embodiments;

FIGS. 59 through 62 illustrate a bioinformation authentication method according to example embodiments.

DETAILED DESCRIPTION

Figure 1:
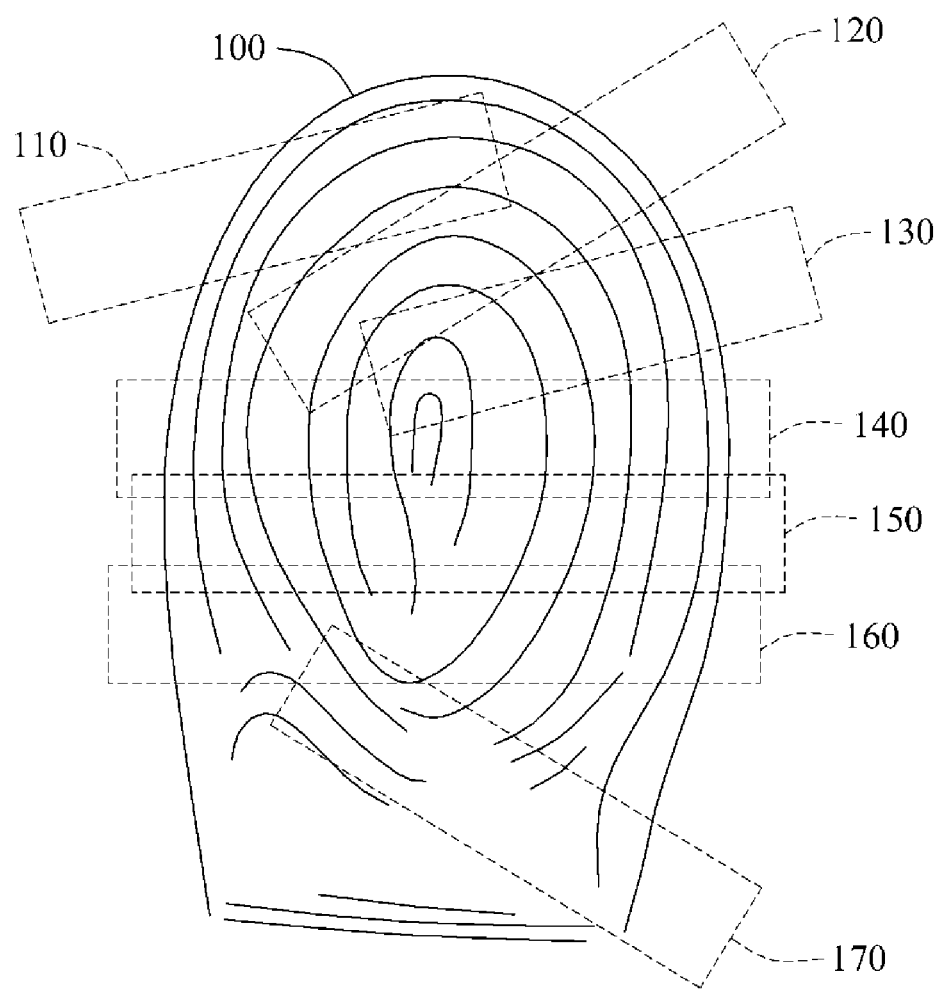
FIGS. 1 and 2 illustrate enrolled images used for fingerprint recognition according to example embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Example embodiments to be described hereinafter may be used for recognizing a fingerprint of a user, and provided in various forms of products including, for example, a personal computer (PC), a laptop computer, a tablet PC, a smartphone, a television (TV), a smart home appliance, an intelligent vehicle, a kiosk, and a wearable device.

An Enrolled Image for Fingerprint Recognition

According to example embodiments, a fingerprint of a user may be enrolled in an enrollment operation. A fingerprint recognizing sensor may capture the fingerprint of the user. The fingerprint of the user may be captured through a sensing region of the fingerprint recognizing sensor. Here, a size of the sensing region of the fingerprint recognizing sensor may be smaller than a size of the fingerprint. For example, referring to FIG. 1, a fingerprint recognizing sensor may have a sensing region of a rectangular form, which is smaller than a size of a fingerprint of a user.

Referring to FIG. 1, a plurality of partial images 110 through 170 is enrolled in response to a single fingerprint 100. Each of the partial images 110 through 170 may cover a portion of the fingerprint 100, and a combination of the partial images 110 through 170 may cover an entire region of the fingerprint 100. Here, the partial images 110 through 170 may overlap.

Figure 2:
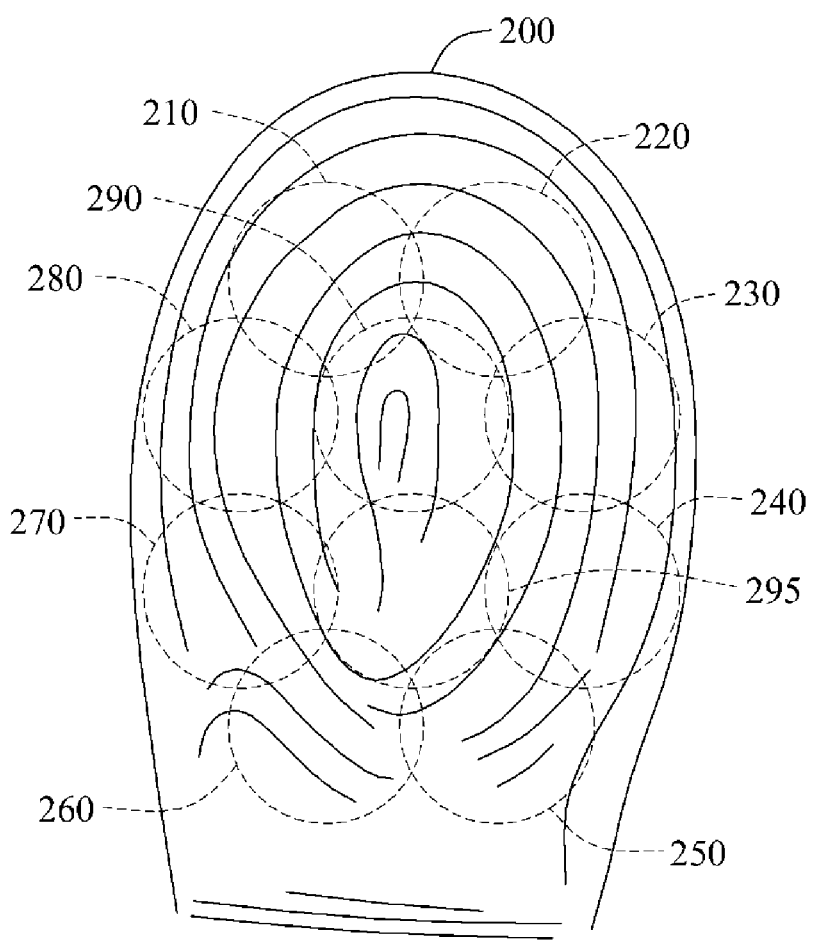

Although the sensing region is illustrated as a rectangular form in FIG. 1, various sizes and forms may be applicable to the sensing region. For another example, referring to FIG. 2, a sensing region may be a circular form. As illustrated in FIG. 2, a plurality of partial images 210 through 295 is enrolled in response to a single fingerprint 200. Hereinafter, an enrolled partial image will be referred to as an enrolled image.

A Fingerprint Recognition Method Using a Lookup Table

A) A Verification Operation

According to example embodiments, a fingerprint of a user may be recognized in a verification operation. The fingerprint of the user may be input through a sensing region of a fingerprint recognizing sensor. Here, a size of the sensing region of the fingerprint recognizing sensor may be smaller than a size of the fingerprint. In such a case, a fingerprint image used for verification may correspond to a portion of the fingerprint of the user. Hereinafter, the fingerprint image for the verification will be referred to as a query image.

Figure 3:
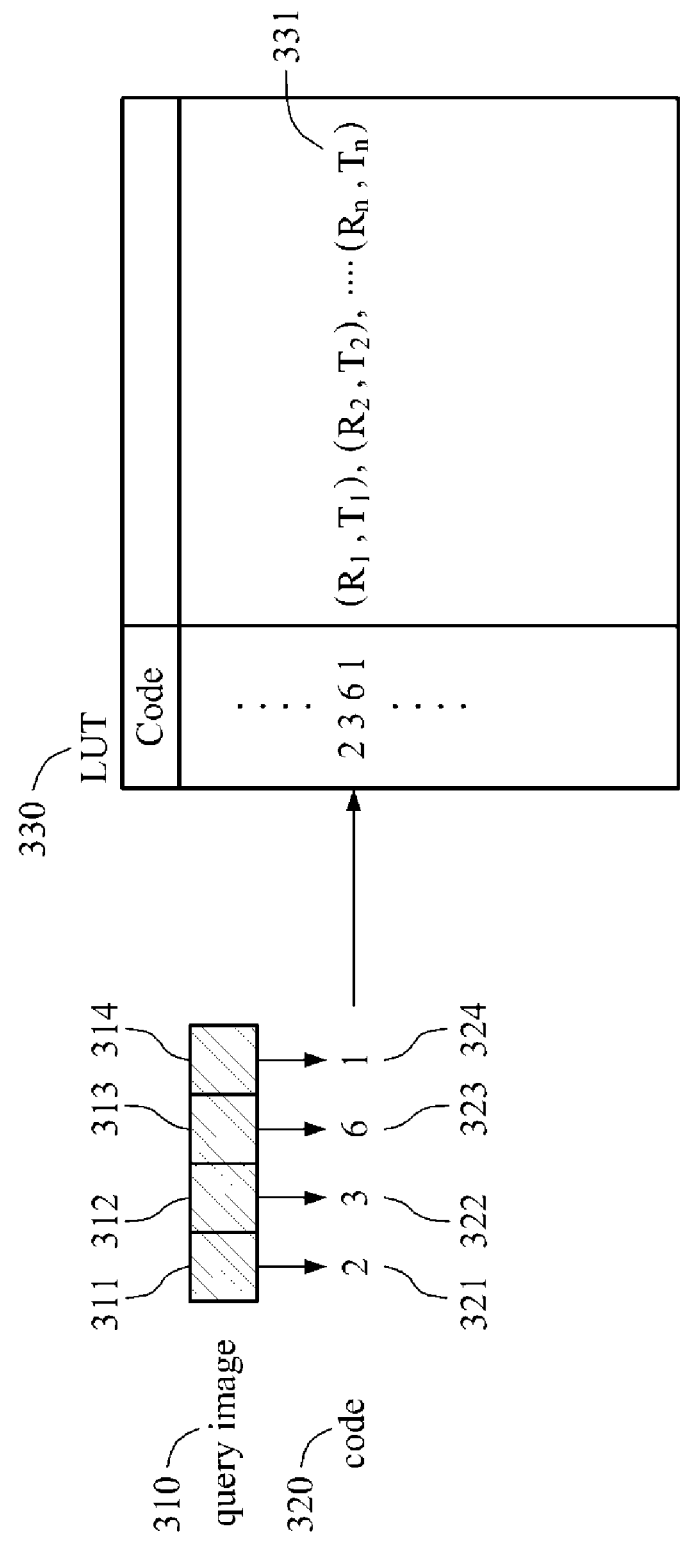
FIGS. 3 through 12 illustrate a fingerprint recognition method using a lookup table according to example embodiments.

Referring to FIG. 3, a query image 310 is divided into a plurality of blocks 311 through 314. Respective code elements 321 through 324 corresponding to the blocks 311 through 314 are calculated and a code 320 corresponding to the query image 310 is calculated. A detailed method of calculating code elements will be further described later. Hereinafter, a code will be referred to as an identity (ID). For ease of description, a case in which the query image 310 is divided into the blocks 311 through 314 is illustrated. However, the query image 310 may be configured as a single block.

A lookup table, for example, a lookup table (LUT) 330 as illustrated in FIG. 3, may include a plurality of codes. The lookup table may be prearranged. A detailed method of generating a lookup table will be further described later. The lookup table may include information corresponding to each code. For example, as illustrated in FIG. 3, the lookup table 330 includes information 331 corresponding to the code 320. Hereinafter, a lookup table may also be referred to as a codebook.

The information corresponding to each code may indicate a portion of a fingerprint region of a registered user. For example, as illustrated in FIG. 3, when the code 320 generated based on the query image 310 is "2361," the information 331 corresponding to the code 320 in the lookup table 330 may indicate candidate regions in the fingerprint region of the user corresponding to the query image 310.

In a lookup table, information corresponding to each code may include rotation information and/or transition information. For example, the information corresponding to each code may be a pair of the rotation information and the transition information. The pair of the rotation information and the transition information may indicate a candidate region that may correspond to a query image corresponding to a code. The lookup table may store a plurality of such pairs in response to a single code.

Figure 4:
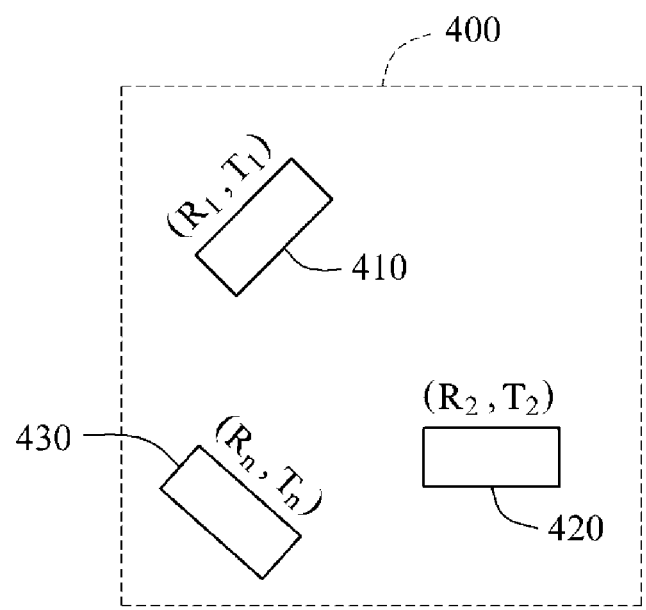

For example, as illustrated in FIG. 3, the information 331 corresponding to the code 320 in the lookup table 330 includes $(R_1, T_1), (R_2, T_2), \ldots (R_n, T_n)$. Referring to FIG. 4, "$(R_1, T_1)$" indicates a first candidate region 410 in a fingerprint region 400 of a user, "$(R_2, T_2)$" indicates a second candidate region 420 in the fingerprint region 400, and "$(R_n, T_n)$" indicates an n-th candidate region 430 in the fingerprint region 400.

Figure 5:
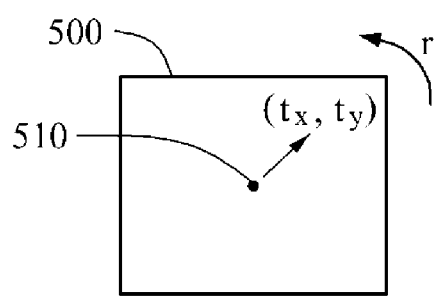

Rotation information and transition information included in a lookup table may be expressed in various forms. As an example, referring to FIG. 5, transition information is expressed as a vector "$(t_x, t_y)$" having a center 510 of a fingerprint region 500 as a starting point, and rotation information is expressed as a rotation angle "r."

According to example embodiments, a limited number of candidate regions may be obtained through a lookup table and thus, a computational complexity may be considerably reduced in the verification operation. For example, when a candidate region that may correspond to a query image is obtained through a lookup table, the query image may be verified by comparing the query image to an enrolled image in the obtained candidate region. Accordingly, the computational complexity may be considerably reduced in the verification operation.

Figure 6:
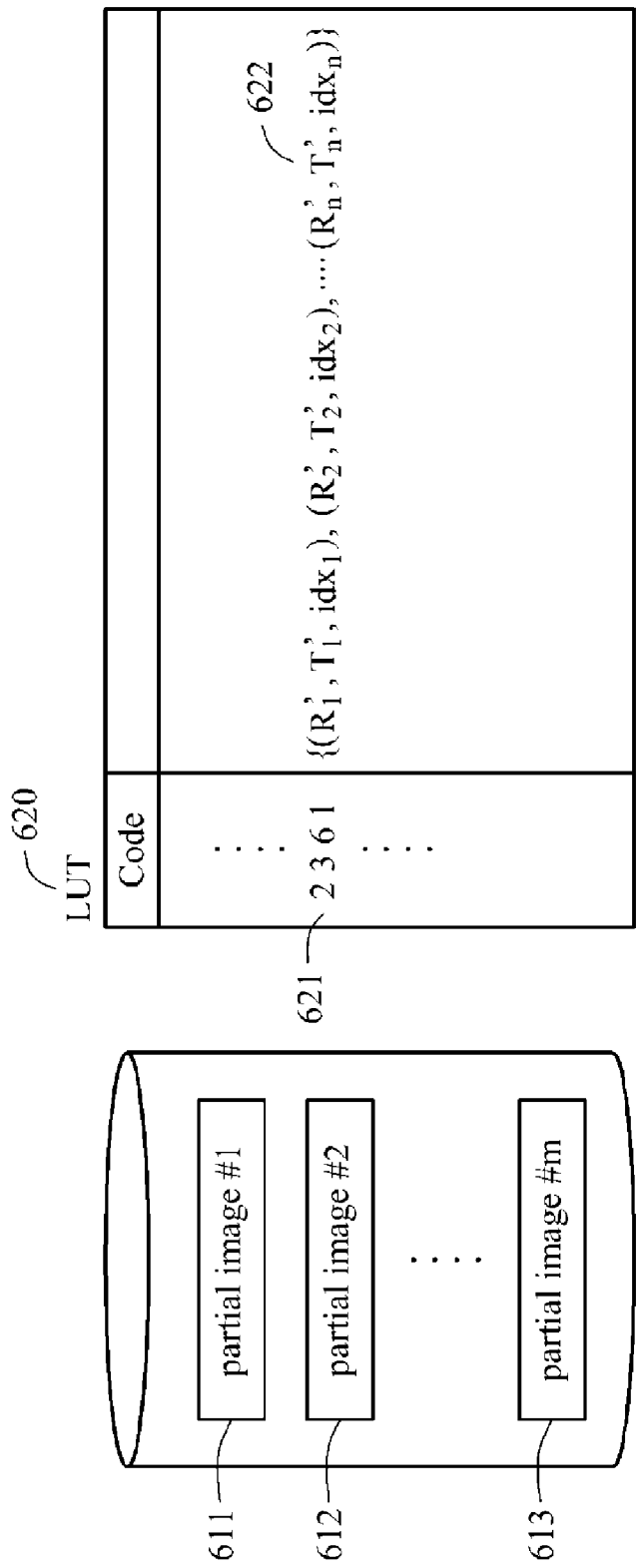

Referring to FIG. 6, information corresponding to a code 621 in a lookup table 620 may only include information 622 indicating a portion of enrolled images, for example, partial images 611 through 613, corresponding to the code 621 because not all enrolled images are used to verify a query image.

Figure 7:
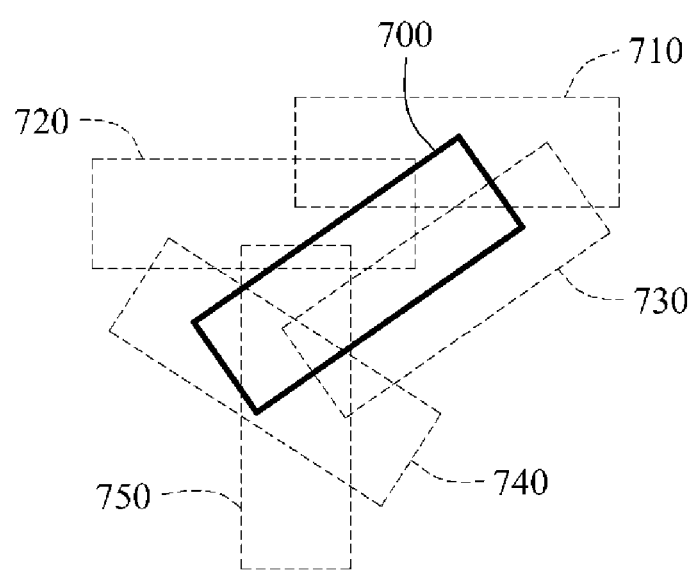

Referring to FIG. 7, enrolled images 710 through 750 having an overlapping region with a query image 700 are selected from among all enrolled images. A lookup table may include indices indicating the enrolled images 710 through 750 to be used for verifying the query image 700. For example, referring to FIGS. 6 and 7, when the code 621 corresponds to the query image 700, the information 622 corresponding to the code 621 in the lookup table 620 may include the indices indicating the enrolled images 710 through 750.

Rotation information to be stored in a lookup table may be relative rotation information between a query image and an enrolled image. Similarly, transition information to be stored in the lookup table may be relative transition information between the query image and the enrolled image.

Figure 8:
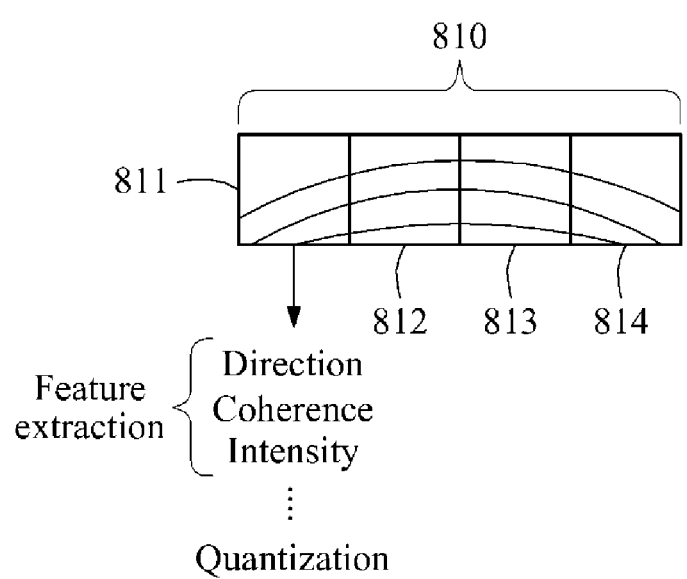

According to example embodiments, a query image and/or an enrolled image may be divided into a plurality of blocks, and a code for the query image and/or the enrolled image may be generated. For ease of description, a case in which the query image and/or the enrolled image is divided into the blocks is illustrated. However, the query image or the enrolled image may be configured as a single block. For example, referring to FIG. 8, a query image or an enrolled image 810 is divided into a plurality of blocks 811 through 814. Here, a feature of a block may be extracted to generate a code corresponding to the block. The feature to be extracted may include a direction of a fingerprint included in the block, a directional coherence of the fingerprint, or an intensity of the fingerprint. The extracted feature may be quantized to be a predetermined and/or desired dimension. A result of the quantizing may be variously expressed as, for example, a decimal number and a binary number.

Figure 9:
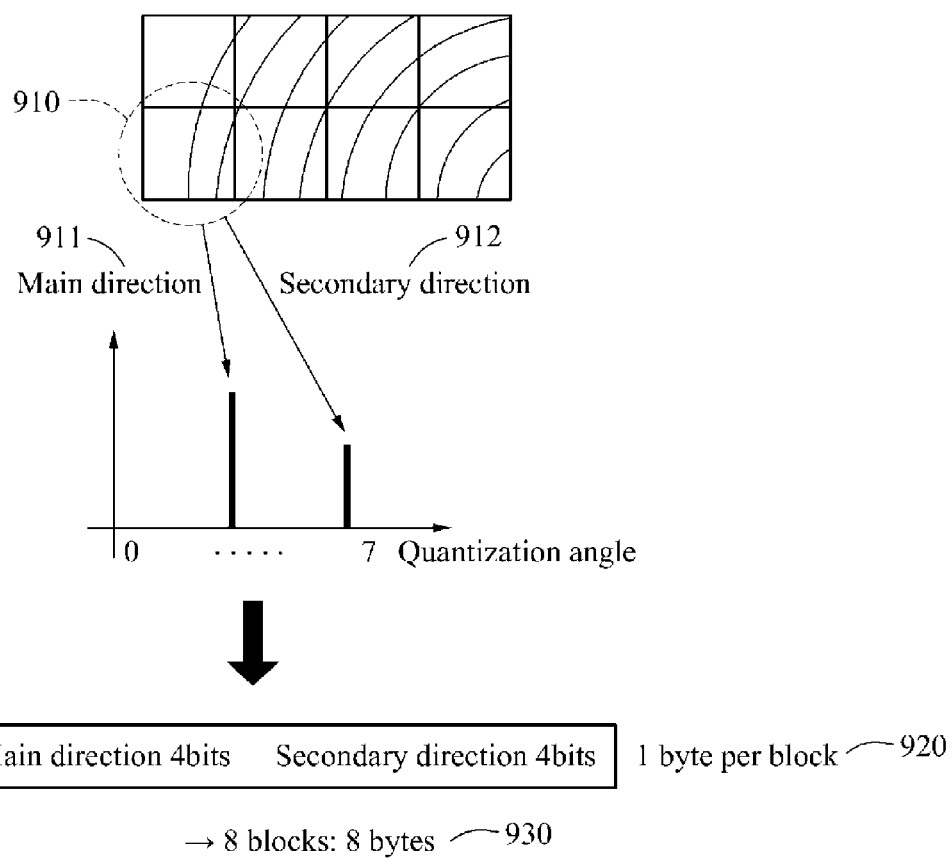

Referring to FIG. 9, a main direction 911 and a secondary direction 912 of a block 910 are extracted to generate a code corresponding to the block 910. The extracted main direction 911 and the secondary direction 912 may be quantized to be a predetermined and/or desired dimension. For example, when the main direction 911 and the secondary direction 912 are quantized to be 8 directions, 3 bits may be needed to indicate each of the main direction 911 and the secondary direction 912. When 4 bits (with extra 1 bit) are allocated to each of the main direction 911 and the secondary direction 912, 1 byte 920 may be needed to indicate the main direction 911 and the secondary direction 912 of the block 910. Thus, when a code or an ID is generated using 8 blocks, a total of 8 bytes 930 may be needed. The number of blocks included in the quantized dimension, the code, or the ID may be variously modified.

Figure 10:
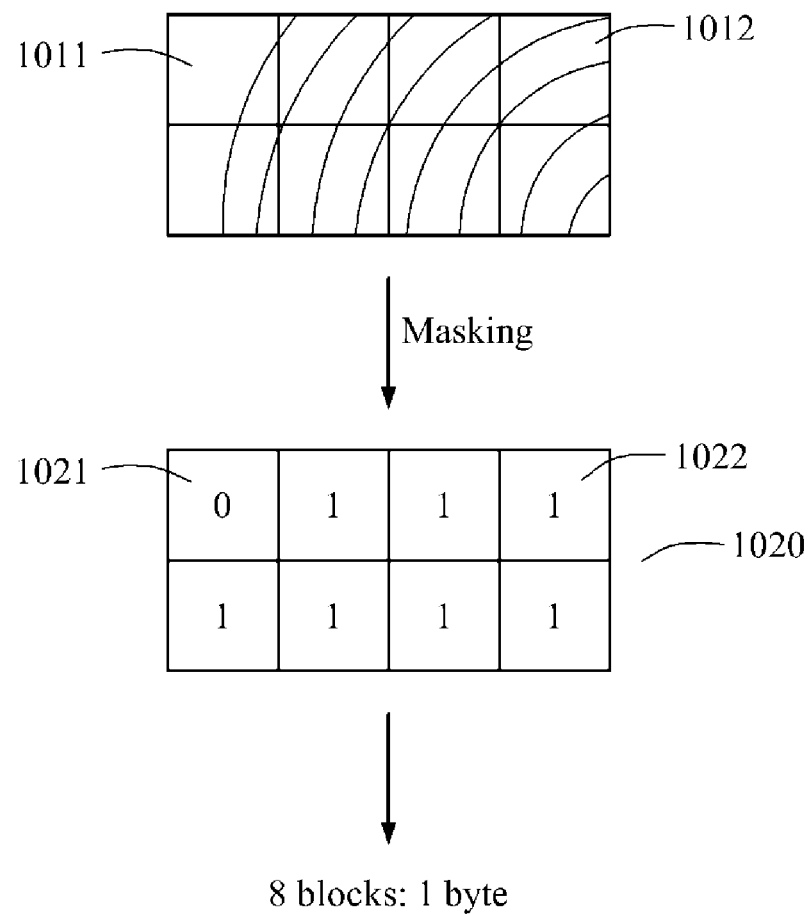

Referring to FIG. 10, masking information 1020 of blocks included in a code or an ID is generated. For example, masking information 1021 of a block 1011 without including a fingerprint may be set to be "0," and masking information 1022 of a block 1012 including the fingerprint may be set to be "1." When a code or an ID is generated using 8 blocks, a total of 1 byte masking information may be generated. Various standards may be applicable for setting such masking information and the number of blocks included in the code or the ID.

Referring to FIGS. 9 and 10, the code or the ID may be configured by combining information on the main direction 911 and the secondary direction 912 of the 8 bytes 930 generated as illustrated FIG. 9 and the 1 byte masking information generated as illustrated in FIG. 10. In such a case, the code or the ID may be configured with a total of 9 bytes.

According to example embodiments, in generating a code, the code may vary based on an error that may occur due to quantization and the like. For example, referring to FIG. 11, varying a code 1120 generated from a query image 1110 may increase fingerprint recognition accuracy. For example, the code 1120 generated from the query image 1110 may be expressed as a plurality of numerals. In such an example, at least one numeral may vary within a predetermined and/or desired range. For example, as illustrated in FIG. 11, "1" of the code 1120 may vary to "0" or "2," "6" of the code 1120 may vary to "5" or "7," "3" of the code 1120 may vary to "2" or "4," or "2" of the code 1120 may vary to "1" or "3."

Figure 11:
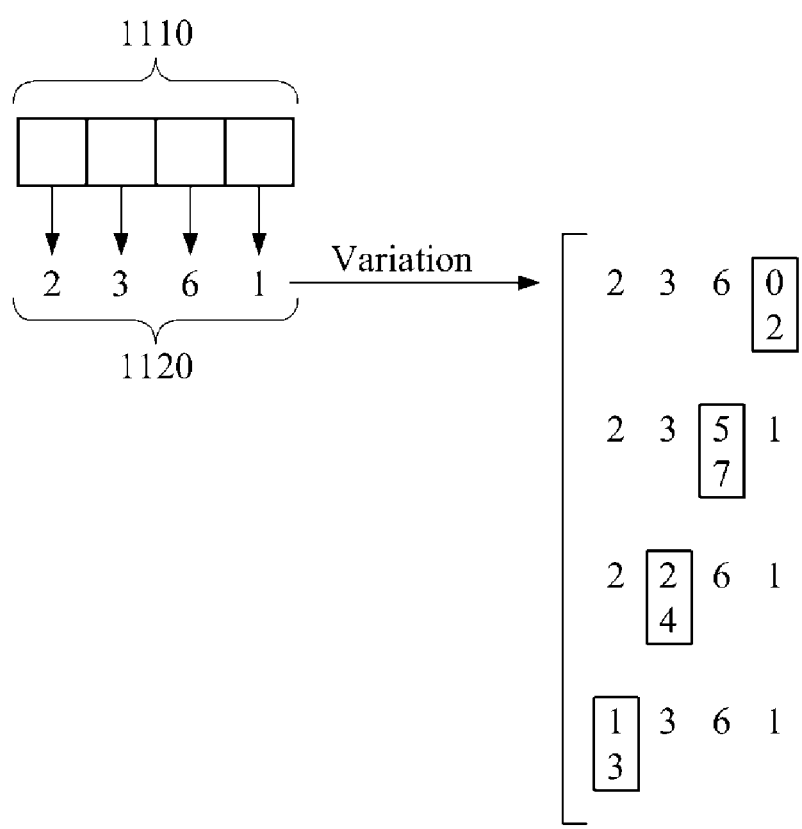

Although FIG. 11 illustrates an example of signal-digit variation, two or more digits may vary. In addition, although FIG. 11 illustrates the predetermined and/or desired range of +1 or −1, the predetermined and/or desired range may be variously modified.

B) An Enrollment Operation

According to example embodiments, a lookup table may be generated in an enrollment operation. In addition, an entire fingerprint image may be obtained in the enrollment operation. For example, the entire fingerprint image may be generated by stitching a plurality of partial images. The entire fingerprint image may be obtained by arranging the partial images in corresponding positions in a fingerprint region.

Figure 12:
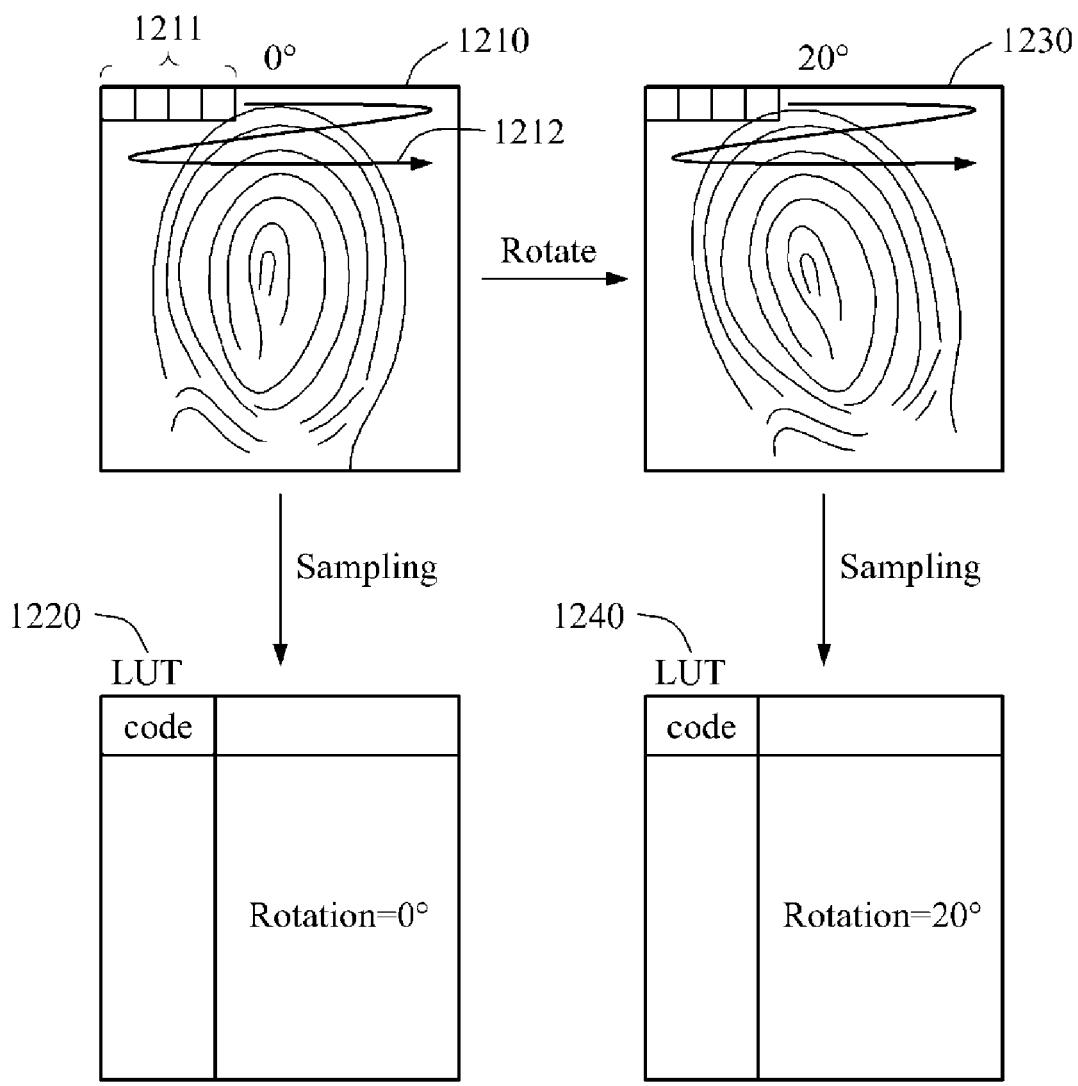

Referring to FIG. 12, an entire fingerprint image 1210 is divided into a plurality of blocks. For ease of description, a case in which the entire fingerprint image 1210 is divided into the blocks is illustrated. However, the entire fingerprint image 1210 may be configured as a single block.

The entire fingerprint image 1210 may be scanned 1212 using a predetermined and/or desired window 1211. The window 1211 may have a size equal to a size of a query image. The window 1211 may include a plurality of blocks. During the scanning 1212, a code or an ID corresponding to a portion currently covered by the window 1211 may be generated through the methods described with reference to FIGS. 8 through 11. The generated code or ID may be stored in a lookup table.

In addition, information corresponding to the generated code or ID may be stored in the lookup table. The information corresponding to the generated code or ID may include transition information and rotation information. The transition information may be set to be coordinate information and vector information indicating the position of the portion currently covered by the window 1211. The rotation information may be set to be a rotation angle of the entire fingerprint image 1210. For example, when the entire fingerprint image 1210 is not a rotated image, the rotation information may be set to be "0."

As illustrated in FIG. 11, when a lookup table 1220 is generated based on the entire fingerprint image 1210, the entire fingerprint image 1210 may be rotated at a predetermined and/or desired angle, for example, 20°. The rotated fingerprint image 1230 may be divided into a plurality of blocks, and a code or an ID may be generated from the blocks. Alternatively, the rotated fingerprint image 1230 may be configured as a single block. Thus, information corresponding to the generated code or ID may be generated and thus, a lookup table 1240 may be generated. Here, the rotation angle may be set to be an angle, for example, 20°, at which the entire fingerprint image 1210 is rotated.

According to example embodiments, a lookup table corresponding to each rotation angle may be generated by repeating the operations described in the foregoing and performing sampling at various rotation angles. The lookup table corresponding to each rotation angle may be managed as a single lookup table.

When using a lookup table, various forms of information to be stored in the enrollment operation may be utilized. For example, the information to be stored in the enrollment operation may be modified based on a case as illustrated in Table 1.

TABLE 1

Case 1) LUT + enrolled images
Case 2) LUT + stitched image
Case 3) LUT + enrolled images + stitched image In Case 1, the lookup table may be used based on the method described with reference to FIGS. 6 and 7. In Case 2, the lookup table may be used based on the method described with reference to FIGS. 3 and 4. In Case 3, the lookup table may be used based on the method of Case 1, the method of Case 2, or a combination of the two methods.

A Fingerprint Recognition Method Using a Directional Coherence

A) An Enrollment Operation—Fingerprint Stitching

According to example embodiments, a plurality of partial images may be arranged or aligned based on a degree of proximity to a center of a fingerprint. Thus, partial images corresponding to an outer portion of the fingerprint may be sequentially stitched based on a partial image corresponding to the center of the fingerprint.

For example, fingerprint stitching may be performed based on a directional coherence. A plurality of partial images corresponding to a single fingerprint may be stitched using a characteristic that ridges in the fingerprint are intensively distributed along a dominant orientation. For example, each of the partial images may be divided into a plurality of blocks, and dominant orientations in the blocks may be calculated. For ease of description, a case in which a partial image is divided into a plurality of blocks is illustrated. However, the partial image may be configured as a single block. The partial images may be stitched based on the dominant orientations in the blocks.

To stitch the partial images, a stitching order of the partial images may be necessary. For example, partial images corresponding to an outer portion of a fingerprint may be stitched, starting from a partial image corresponding to a central portion of the fingerprint. The partial image corresponding to the central portion of the fingerprint and the partial images corresponding to the outer portion of the fingerprint may be determined based on a directional coherence of each partial image. The directional coherence may indicate a coherence of orientations in blocks obtained by dividing a partial image.

Figure 13:
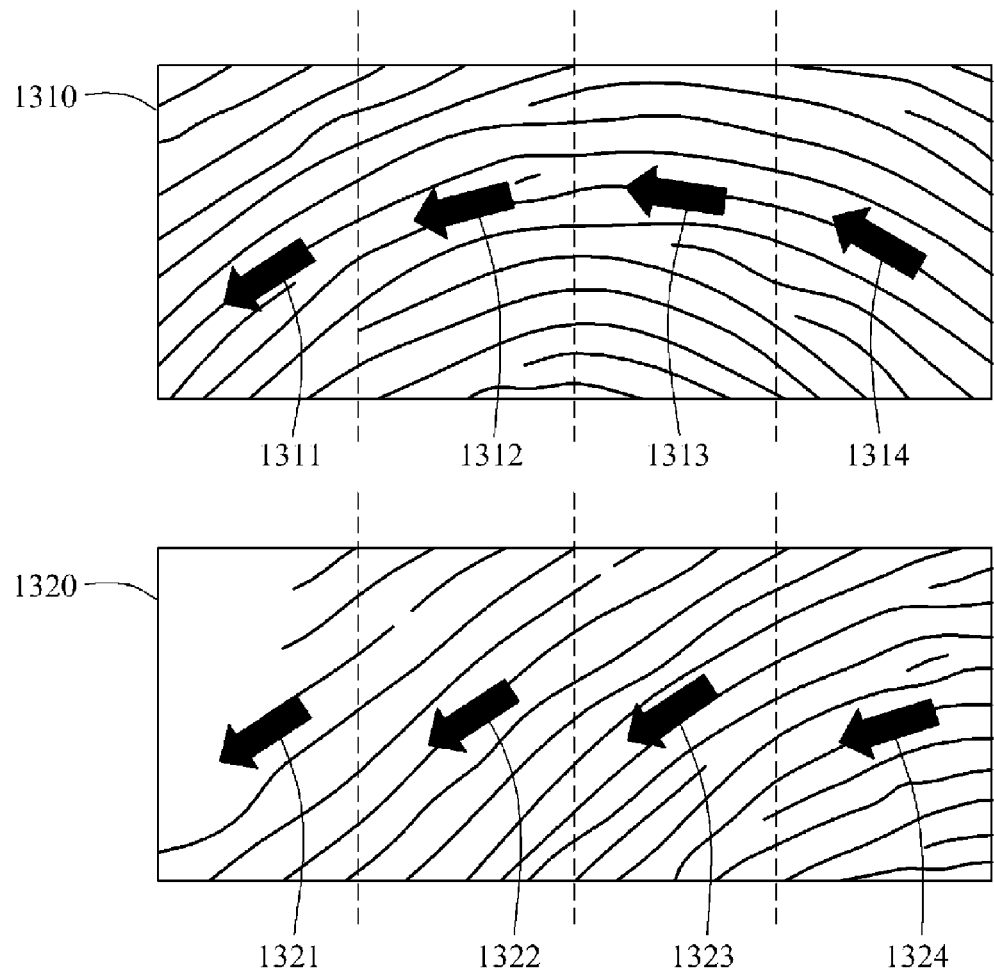
FIGS. 13 through 23 illustrate a fingerprint recognition method using a directional coherence according to example embodiments.

Referring to FIG. 13, dominant orientations 1311 through 1314 in blocks obtained by dividing a partial image 1310 corresponding to a central portion of a fingerprint have a low coherence. In contrast, dominant orientations 1321 through 1324 in blocks obtained by dividing a partial image 1320 corresponding to an outer portion of the fingerprint have a high coherence. Thus, a higher directional coherence of a partial image may indicate a higher probability of the partial image corresponding to an outer portion of a fingerprint. Conversely, a lower directional coherence of a partial image may indicate a higher probability of the partial image corresponding to a central portion of the fingerprint.

To calculate a directional coherence of a partial image, a gradient-based structural tensor may be calculated. For example, the structural tensor may be calculated as expressed in Equation 1.

$$S(i) = \begin{bmatrix} \sum_{j \in B_i} I_x^2(j) & \sum_{j \in B_i} I_x(j)I_y(j) \\ \sum_{j \in B_i} I_x(j)I_y(j) & \sum_{j \in B_i} I_y^2(j) \end{bmatrix} \qquad \text{[Equation 1]}$$

In Equation 1, "i" denotes an index of a block. "$B_i$" denotes an i-th block. "S(i)" denotes a structural tensor for $B_i$. "j" denotes an index of a pixel included in $B_i$. "$I_x(j)$" denotes a gradient of a j-th pixel in an x axial direction, and "$I_y(j)$" denotes a gradient of the j-th pixel in a y axial direction.

A main direction and a directional coherence may be calculated through singular value decomposition (SVD) of a structural tensor. For example, a largest eigen-value may be obtained by performing the SVD on a structural tensor for a block. Referring to Equation 2, a main direction of the block may be calculated using an eigen-vector corresponding to the largest eigen-value.

$$\theta = \tan^{-1}(v_y^1/v_x^1), \text{ where } v_1 = [v_x^1, v_y^1]^T \qquad \text{[Equation 2]}$$

In Equation 2, "$v_1$" denotes a largest eigen-vector, and "$v_x^1$" and "$v_y^1$" denote an x-axis directional element of $v_1$ and a y-axis directional element of $v_1$, respectively. "θ" denotes a main direction.

In addition, the largest eigen-value and a second largest eigen-value may be obtained by performing the SVD on the structural tensor for the block. Referring to Equation 3, a directional coherence of the block may be calculated using the largest eigen-value and the second largest eigen-value.

$$c = (\lambda_1 - \lambda_2)/(\lambda_1 + \lambda_2) \qquad \text{[Equation 3]}$$

In Equation 3, "$\lambda_1$" and "$\lambda_2$" denote a largest eigen-value and a second largest eigen-value, respectively. "c" denotes a directional coherence. Although an example of calculating a directional coherence of a partial image based on a gradient-based structural tensor is described in the foregoing, the directional coherence of the partial image may be calculated through various methods using, for example, an orientation histogram.

A directional coherence of a partial image may be determined using a directional coherence of each block included in the partial image. For example, referring to Equation 4, a minimum directional coherence among directional coherences of blocks included in a partial image may be determined to be a directional coherence of the partial image.

$$c_i = \underset{i}{\mathrm{argmin}}\{(\lambda_1^i - \lambda_2^i)/(\lambda_1^i + \lambda_2^i)\} \quad \text{[Equation 4]}$$

In Equation 4, "i" denotes an index of a block. "$\lambda_1^i$" and "$\lambda_2^i$" denote a largest eigen-value of an i-th block and a second largest eigen-value of the i-th block. "$c_i$" denotes a directional coherence of the i-th block.

Figure 14:
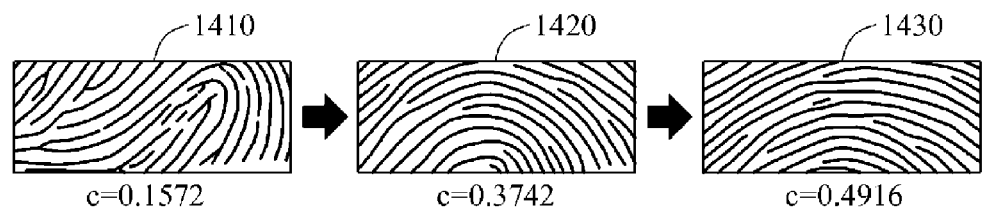

A directional coherence may provide an ordinal signature for stitching, and directional coherences of partial images may be used for stitching ordering. For example, when the respective directional coherences of the partial images are calculated, the partial images may be arranged in an order starting from a partial image having a minimum directional coherence to a partial image having a maximum directional coherence. For example, referring to FIG. 14, a second partial image 1420 having a second smallest directional coherence may be stitched to a first partial image 1410 having a minimum directional coherence. Here, the first partial image 1410 having the minimum directional coherence may correspond to a central portion of a fingerprint. Further, a third partial image 1430 having a maximum directional coherence may be stitched to a result of stitching the first partial image 1410 and the second partial image 1420.

Table 2 illustrates an image stitching algorithm based on dense matching.

TABLE 2

Algorithm 1. Image stitching based on dense matching

1. Find the center image using the minimum c
2. Stitch enroll images using s_pos obtained from the average of intensity difference $$s\_pos = \underset{i,j}{\mathrm{argmin}} D, \text{ where } D = \frac{1}{\mathrm{Card}(B_{ij})} \sum_{(x,y) \in B_{ij}} |I_{query}(x, y) - I_{sitch}(x, y)|$$

3. If D > th, then stitching is not conducted (for non-overlapped region)

In Table 2, "(i, j)" denotes a position to which a query image slides, and "$B_{ij}$" denotes a block generated at the (i, j) position. "$\mathrm{Card}(B_{ij})$" denotes a size of $B_{ij}$. "(x, y)" denotes a position of a pixel in the block. "$I_{query}(x,y)$" denotes an intensity of the query image at the (x, y) position, and "$I_{stitch}(x,y)$" denotes an intensity of a stitched image at the (x, y) position. "D" denotes an average intensity difference. "s_pos" denotes a reference value to determine whether to perform stitching. "th" denotes a threshold value.

According to example embodiments, a difference in dominant orientations among partial images in an enrollment set may be calculated. For example, when a query image is added to the enrollment set, a difference in dominant orientations between an enrolled image and the query image may be calculated as expressed in Equation 5.

$$\theta_{diff} = \theta_{enroll} - \theta_{query} \quad \text{[Equation 5]}$$

In Equation 5, "$\theta_{enroll}$" and "$\theta_{query}$" denote a dominant orientation of an enrolled image and a dominant orientation of a query image, respectively. "$\theta_{diff}$" denotes a difference in the dominant orientations between the enrolled image and the query image. $\theta_{query}$ may be calculated as expressed in Equation 6.

$$\theta_{query} = \theta_i = \underset{i}{\mathrm{argmax}} c(i) \quad \text{[Equation 6]}$$

In Equation 6, "i" denotes an index of a block in the query image. $\theta_{enroll}$ may be calculated as expressed in Equation 7.

$$\theta_{enroll} = \theta_i = \underset{i}{\mathrm{argmin}} |\theta_i - \theta_{query}| \quad \text{[Equation 7]}$$

In Equation 7, "i" denotes an index of a block in the enrolled image.

According to example embodiments, fingerprint matching may be performed based on a dominant orientation and a coherence of dominant orientations. After directional coherence-based arrangement is completed, two-stage fingerprint stitching may be performed. For example, referring to FIGS. 15A and 15B, 18 enrolled images may be arranged in an ascending order of directional coherences. The arranged enrolled images, for example, an enrolled image 1511, an enrolled image 1512, and an enrolled image 1513, may be individually stitched using operations 1510 through 1550 to be described with reference to FIG. 15B. In FIG. 15B, "k" denotes an index of each of the arranged enrolled images 1511 through 1513.

Referring to FIG. 15B, in operation 1510, a k-th enrolled image is input. In operation 1520, feature information-based matching, which corresponds to a first stage, is performed. The feature information-based matching may include minutiae-based matching. Here, minutiae indicate a feature in a fingerprint image and include, for example, ridge endings and bifurcations. The minutiae-based matching may refer to a method of determining a level of similarity using a feature in a fingerprint image. In operation 1530, whether "$D_m$" is less than "τ" is determined. Here, $D_m$ denotes a feature information-based distance or a feature information-based difference, and "$\tau_1$" denotes a predetermined and/or selected first threshold value. When $D_m$ is less than $\tau_1$, stitching is performed. A matching speed may be improved using the feature information-based matching as the first stage of the two-stage fingerprint stitching.

In operation 1540, when $D_m$ is greater than or equal to $\tau_1$, pixel information-based matching, which corresponds to a second stage, is performed. The pixel information-based matching may include dense matching. In operation 1550, whether "$D_d$" is less than "$\tau_2$" is determined. Here, $D_d$ denotes a pixel information-based distance or a pixel information-based difference, and $\tau_2$ denotes a predetermined and/or selected second threshold value. The first threshold value $\tau_1$ and the second threshold value $\tau_2$ may be set to be equal to or different from each other. When $D_d$ is less than $\tau_2$, stitching is performed. When $D_d$ is greater than or equal to $\tau_2$, stitching is not performed. As the arranged enrolled images 1511 through 1513 are individually stitched, a final stitched image 1570 is generated through an intermediate stitched image 1560.

According to example embodiments, a matching speed may be improved through the feature information-based matching. In detail, "s_pos" may be calculated based on a coherence characteristic of fingerprint ridges among enrolled images. For example, the s_pos may be calculated using a relationship among ridge endings and/or bifurcations. Here, a ridge ending indicates a point at which a fingerprint ridge ends, and a bifurcation indicates a point from which a fingerprint ridge bifurcates.

Figure 16A:
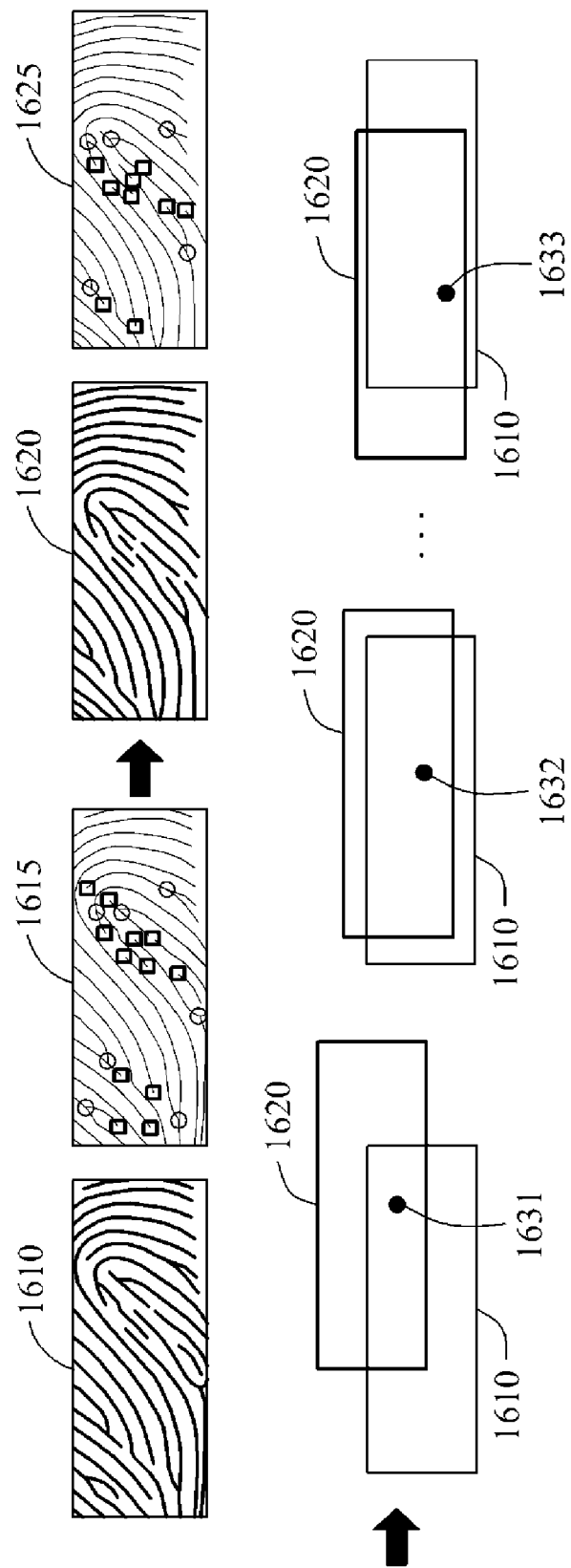

Referring to FIG. 16A, ridge endings and bifurcations may be detected from a partial image 1610 corresponding to a central portion of a fingerprint. The ridge endings are indicated in squares and the bifurcations are indicated in circles in a partial image 1615. Such ridge endings and bifurcations may be detected by thinning ridges included in the partial image 1610. When a subsequent partial image 1620 in a stitching order is received, ridge endings and bifurcations may be detected from the partial image 1620 using the same method described in the foregoing. Similarly, the ridge endings are indicated in squares and the bifurcations are indicated in circles in a partial image 1625.

The s_pos may be calculated by comparing the ridge endings and the bifurcations detected from the partial image 1610 to the ridge endings and the bifurcations detected from the partial image 1620. Based on the calculated s_pos, for example, 1631, 1632, and 1633, matching of the partial image 1610 and the partial image 1620 may be performed.

Figure 16B:
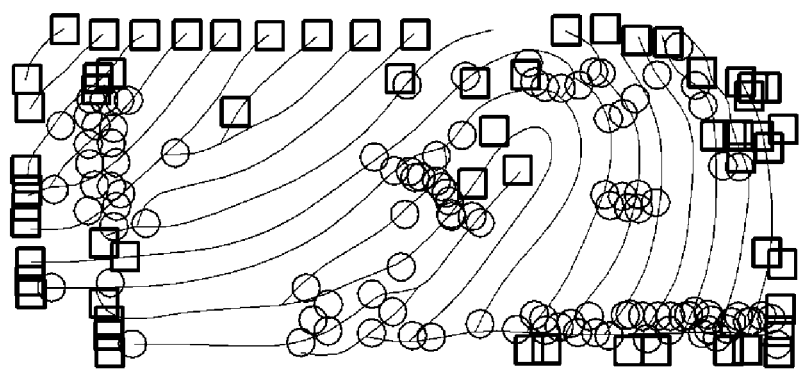

Referring to FIG. 16B, points which do not correspond to ridge endings in an actual fingerprint may be recognized as ridge endings on a boundary of a stitched image. Such a case is referred to as a boundary effect. To eliminate the boundary effect subsequent to stitching, ridge endings present on the boundary of the stitched image may be excluded.

Figure 15A:
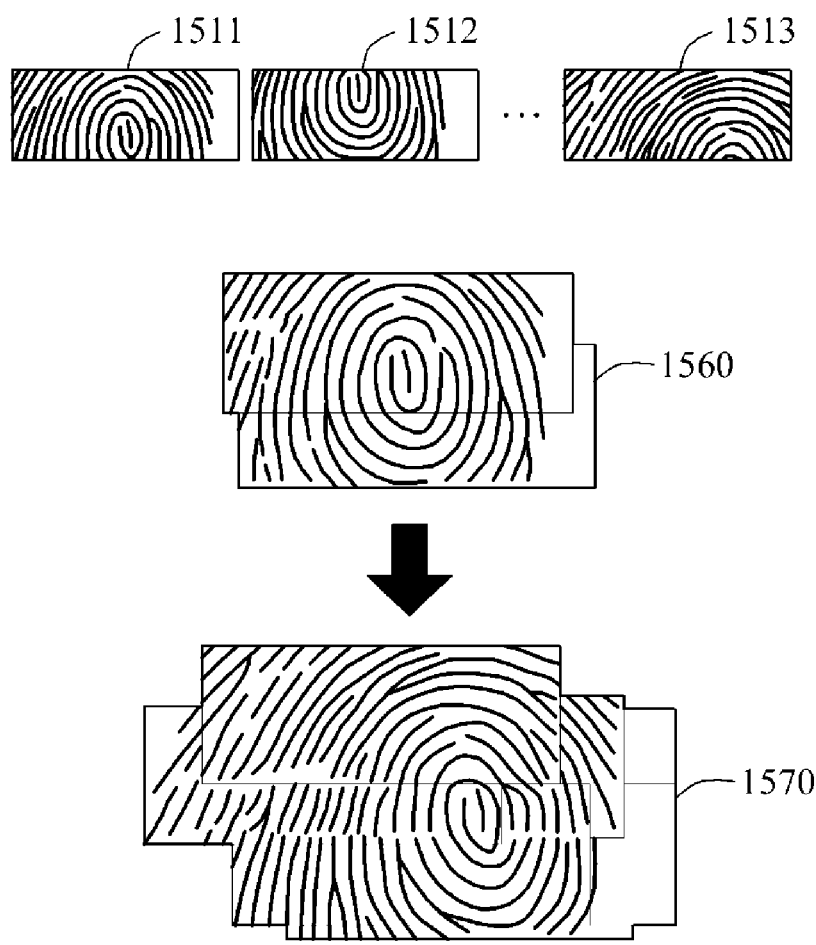
Figure 15B:
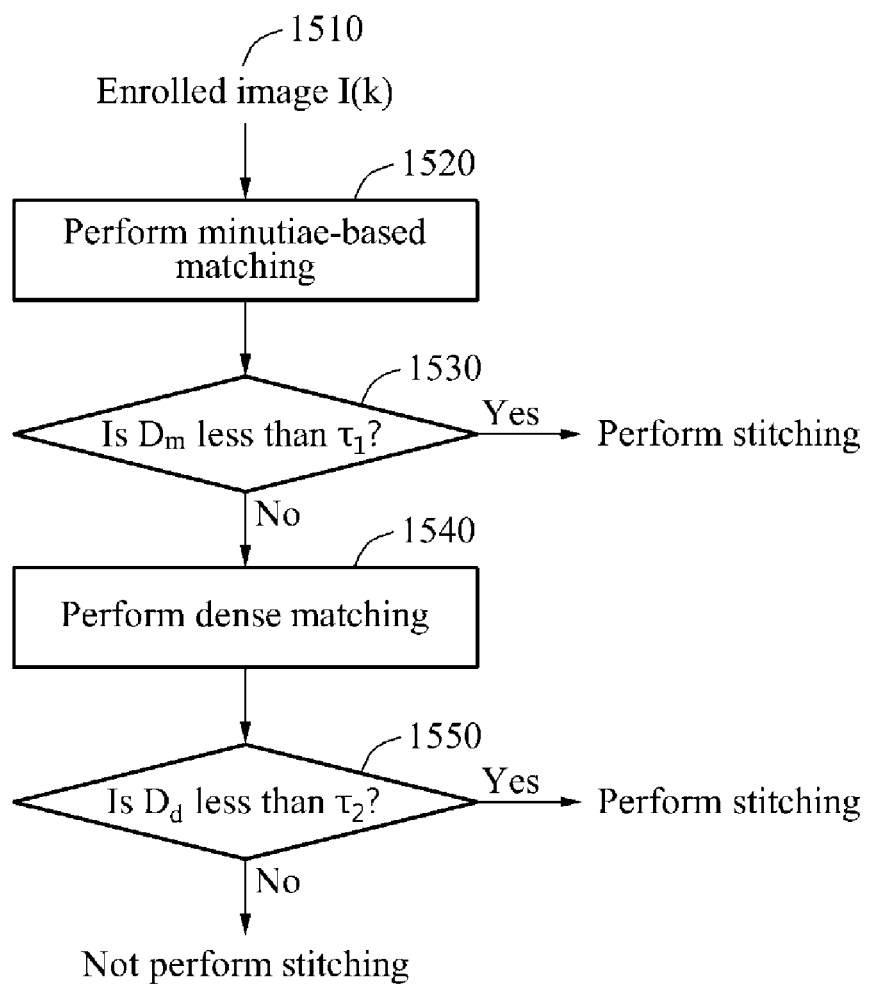

Table 3 illustrates an image stitching algorithm based on feature information-based matching and pixel information-based matching.

print stitching method described with reference to FIGS. 15A and 15B is replaced by whether to perform matching.

Figure 17:
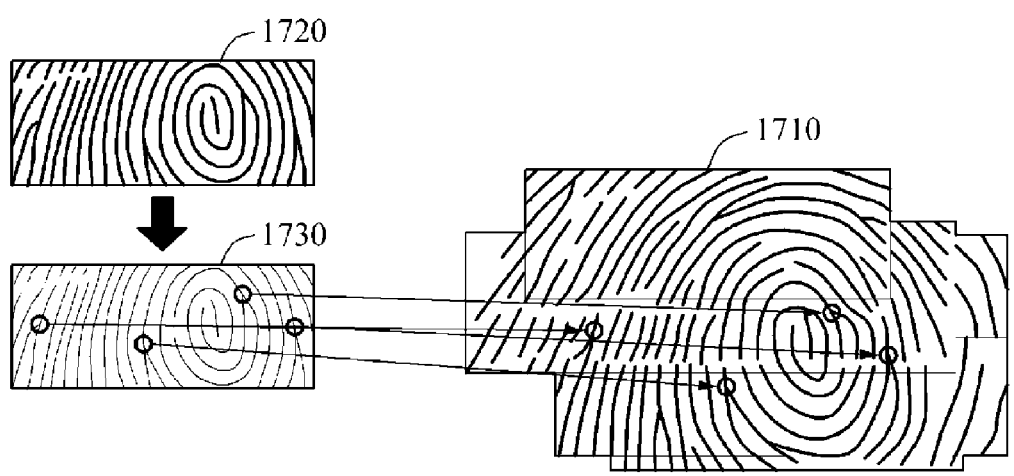

For example, referring to FIG. 17, a bifurcation map may be generated from a stitched image 1710. The bifurcation map may include information on points from which ridges of a fingerprint bifurcate in the stitched image 1710.

When a query image 1720 for fingerprint recognition is received, a binarization image 1730 may be generated from the query image 1720. The binarization image 1730 may be an image obtained by expressing the query image 1720 through binarization. The information on the points from which the ridges of the fingerprint bifurcate may be extracted from the binarization image 1730. An optimal matching region may be detected between bifurcations included in the binarization image 1730 and bifurcations included in the bifurcation map of the stitched image 1710. For example, when the binarization image 1730 includes 10 bifurcations and the stitched image 1710 includes 114 bifurcations in the bifurcation map, the optimal matching region may be detected through a comparison performed 10×114 times.

Figure 18:
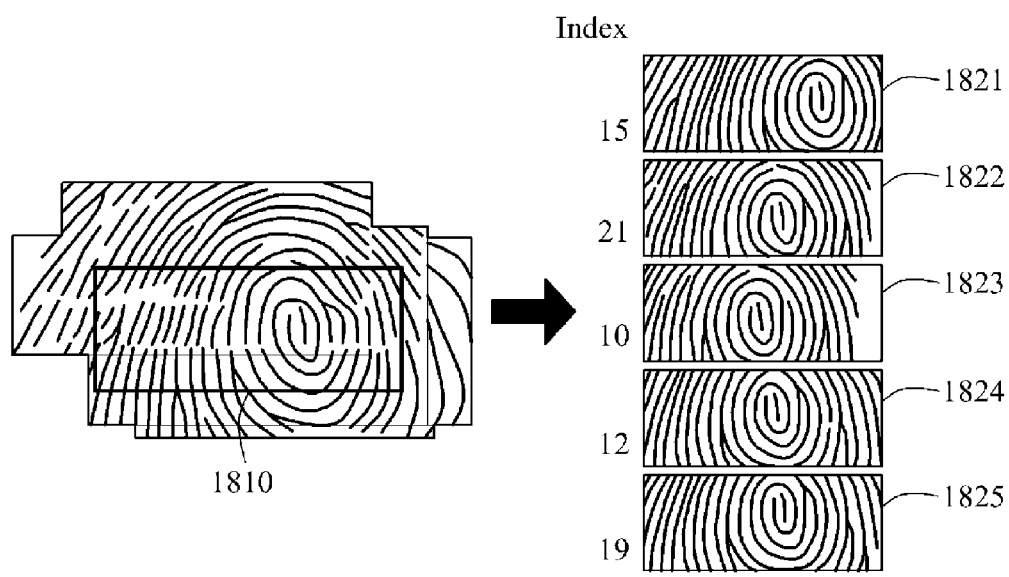

Referring to FIG. 18, enrolled images overlapping a query image may be detected. For example, enrolled images overlapping an optimal matching region 1810 may be detected among all enrolled images. Hereinafter, an overlapping enrolled image will be referred to as an overlapping patch.

For example, as illustrated in FIG. 18, enrolled images 1821 through 1825 having respective indices 15, 21, 10, 12, and 19 may be detected as overlapping patches as a result of applying the two-stage matching method described in the foregoing. The overlapping patches may be detected using a label map in which indices indicating partial images in a stitched image are stored. A predetermined and/or desired

TABLE 3

Algorithm 2. Image stitching based on minutiae and dense matching

1. Find ridge endings
   If Card(ridge endings) is not 0
   2. Stitch based on s_pos based on matching between ridge endings (rx,ry)

$$s\_pos = \operatorname*{argmin}_{rx,ry} D, \text{ where } D = \frac{1}{\operatorname{Card}(B_{rx,ry})} \sum_{(x,y) \in B_{rx,ry}} |I_{query}(x, y) - I_{sitch}(x, y)|$$

* Erosion operator is applied to the binary map of the stitch image
   Else
   2. Stitch based on s_pos using D defined Algorithm 1
3. If D > th, then stitching is not conducted (for non-overlapped region)

* This procedure is repeated for all the enroll images

In Table 3, "(rx, ry)" denotes a position of a ridge ending. "$B_{rx,ry}$" denotes a block generated at the (rx, ry) position. "Card($B_{rx,ry}$)" denotes a size of $B_{rx,ry}$, and "(x, y)" denotes a position of a pixel in the block. "$I_{query}(x,y)$" and "$I_{stitch}(x,y)$" denote an intensity of a query image at the (x, y) position and an intensity of a stitched image at the (x, y) position, respectively. "D" denotes an average intensity difference. "s_pos" denotes a reference value used to determine whether to perform stitching, and "th" denotes a threshold value.

B) A Verification Operation

A stitched image may be used in a verification operation for fingerprint recognition. According to example embodiments, the fingerprint recognition may be performed using a two-stage matching method instead of using a lookup table. The two-stage matching method may refer to a method in which whether to perform stitching in the two-stage finger-number (N) of the overlapping patches may be selected in an order of having a largest overlapping size with the query image. Top N patches among the overlapping patches may be used for fine matching or partial matching.

Figure 19:
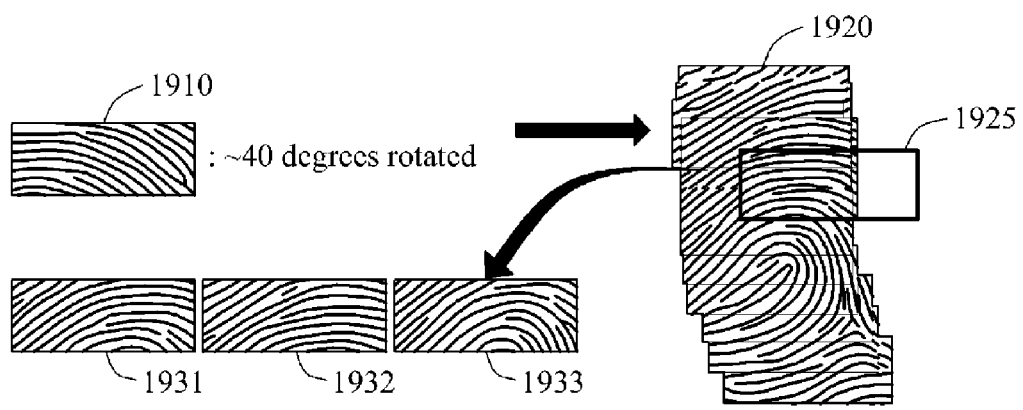

For ease of description, a case in which the fine matching is performed using top three patches is illustrated. However, "N" may have a value other than 3. Referring to FIG. 19, an optimal matching region 1925 in which a stitched image 1920 and a query image 1910 optimally match may be detected. In addition, top three patches 1931, 1932, and 1933 overlapping the optimal matching region 1925 may also be detected.

The detecting of the optimal matching region 1925 and the top three patches 1931 through 1933 may be performed based on the details described with reference to FIGS. 17 and 18. Alternatively, the detecting of the top three patches 1931 through 1933 corresponding to the query image 1910 may be performed using a lookup table based on the details described with reference to FIGS. 6 and 7. For example, indices of enrolled images corresponding to a code of the query image 1910 may be obtained by referring to the lookup table. Among the enrolled images having the obtained indices, three enrolled images having largest sizes overlapping the query image 1910 may be detected as the top three patches 1931 through 1933.

Figure 20:
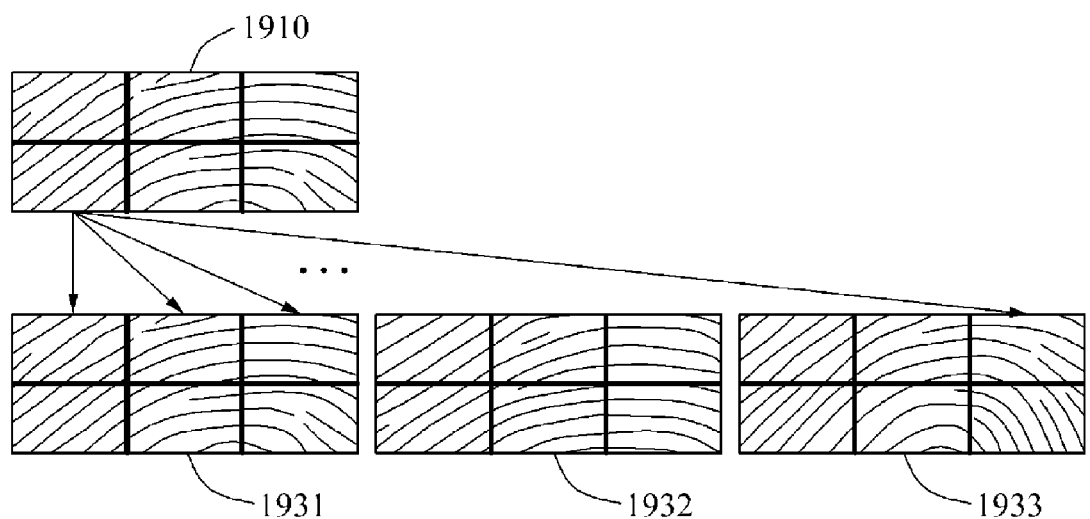

Here, the query image 1910 may be a rotated image. For example, the query image 1910 may be an image rotated at 40°. Through dominant orientation comparison, matching may be performed with the top three patches 1931 through 1933 despite the rotating of the query image 1910. Also, referring to FIG. 20, the query image 1910 and each of the top three patches 1931 through 1933 may be divided into a plurality of blocks. Alternatively, the query image 1910 and each of the top three patches 1931 through 1933 may be configured as a single block. A dominant orientation of each block may be calculated.

Figure 21:
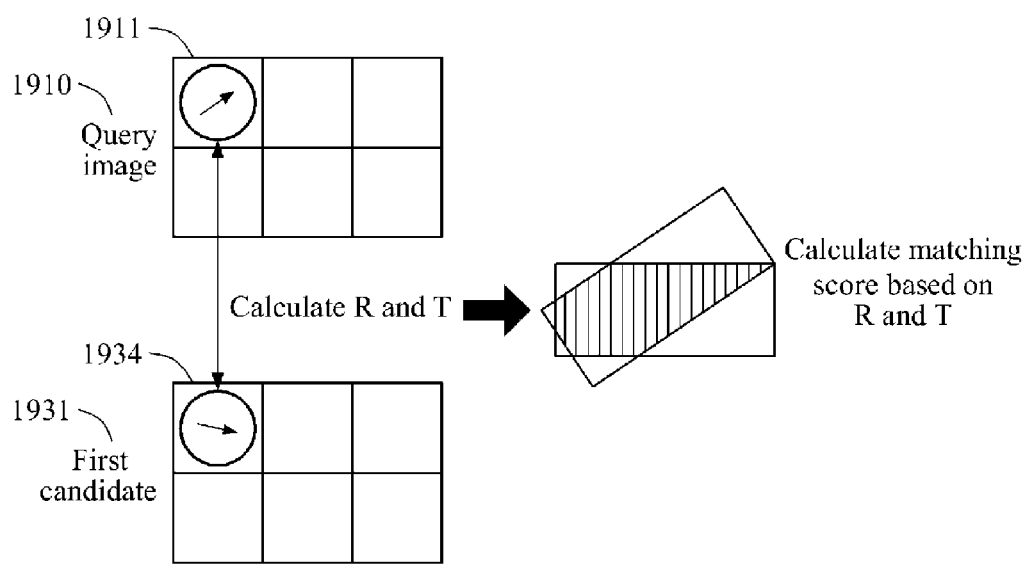

Referring to FIG. 21, the dominant orientation comparison may be performed using a first block 1911 of the query image 1910 and a first block 1934 of a first candidate 1931. Here, the first candidate 1931 may be one of the top three patches 1931 through 1933. As a result of the dominant orientation comparison, rotation (R) and transition (T) may be calculated and a matching score between the query image 1910 and the first candidate 1931 may be calculated based on the calculated rotation and transition.

Figure 22:
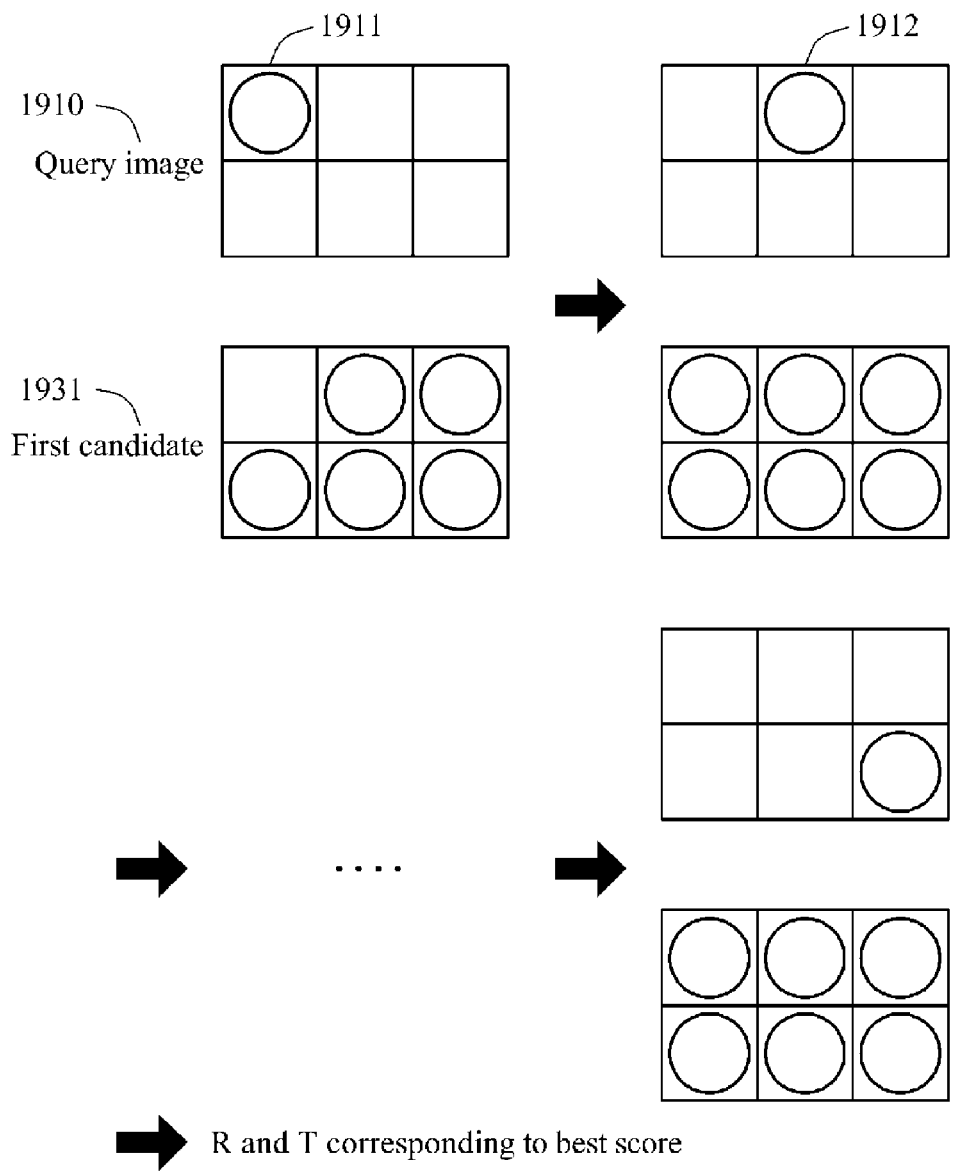

Referring to FIG. 22, matching scores between the query image 1910 and the first candidate 1931 may be calculated using the first block 1911 of the query image 1910 and each of remaining blocks of the first candidate 1931. In addition, matching scores between the query image 1910 and the first candidate 1931 may be calculated using a second block 1912 of the query image 1910 and each of blocks of the first candidate 1931. Thus, 36 matching scores between the query image 1910 and the first candidate 1931 may be calculated by repeating the operations described in the foregoing. The number of the matching scores to be calculated may vary depending on a method of dividing the query image 1910 and the first candidate 1931. Although not illustrated in FIG. 22, dominant orientations of blocks of the query image 1910 and blocks of the first candidate 1931 may differ.

A best score may be selected from among the calculated 36 matching scores.

Alternatively, an average of the calculated 36 matching scores may be calculated. As another alternative, a clustered average of the calculated 36 matching scores may be calculated. The operations described in the foregoing may be identically applied to a second candidate 1932 and a third candidate 1933.

A candidate having a highest best score may be selected from among the first candidate 1931, the second candidate 1932, and the third candidate 1933 to verify the query image 1910. Alternatively, a candidate having a highest average score may be selected from among the first candidate 1931, the second candidate 1932, and the third candidate 1933 to verify the query image 1910. As another alternative, a candidate having a highest clustered average score may be selected from among the first candidate 1931, the second candidate 1932, and the third candidate 1933 to verify the query image 1910.

Alternatively, a best score may be calculated without distinguishing the candidates. In such a case, a candidate having the best score may be selected to verify the query image 1910.

Figure 23:
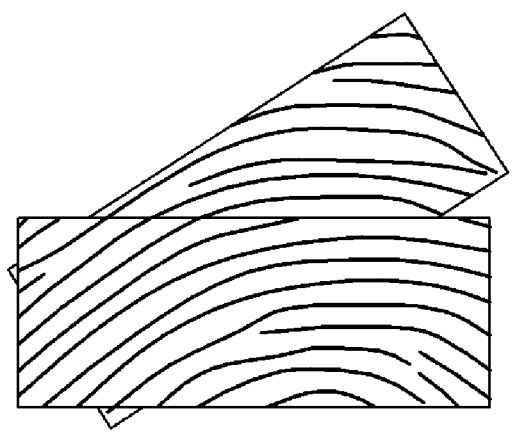

Referring to FIG. 23, rotation information may be calculated to be 32.5°, and transition information may be calculated to be "Tx=72, Ty=1."

A Method of Storing a Stitching Result

Figure 24:
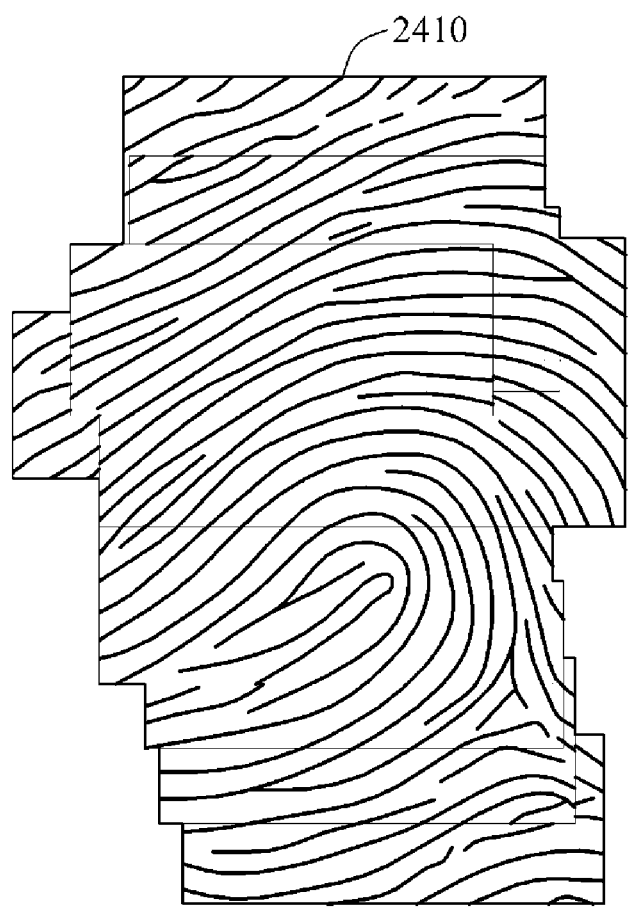
FIGS. 24 through 28 illustrate a method of storing a result of stitching according to example embodiments.
Figure 25:
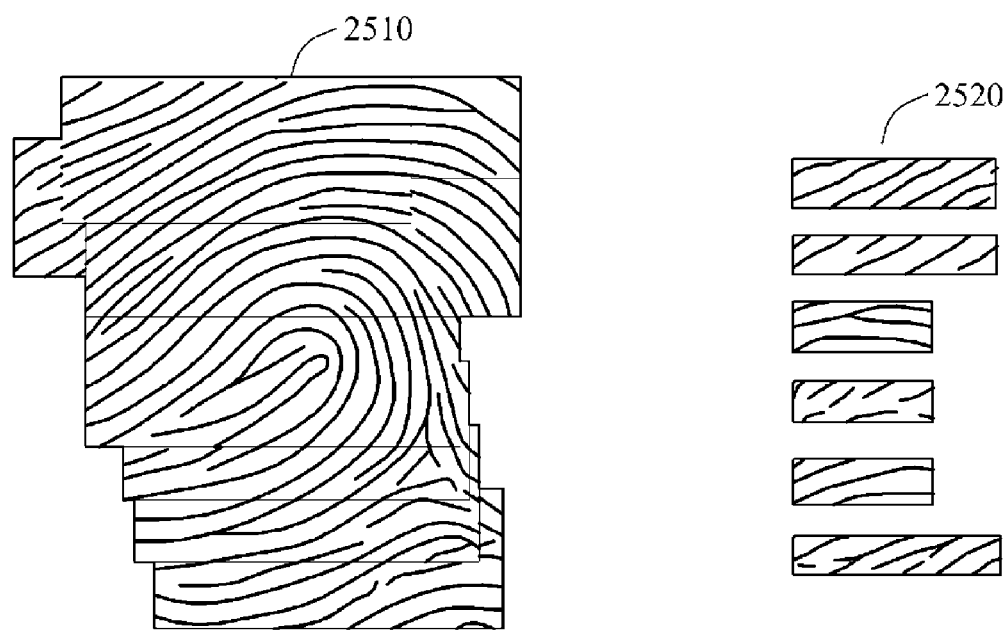

According to example embodiments, a result of stitching may be stored through various methods. In an example, referring to FIG. 24, only a stitched image 2410 may be stored. In another example, referring to FIG. 25, not all enrolled images may be used to generate a stitched image 2510. Enrolled images 2520 that are not used to generate the stitched image 2510 may be separately stored and managed.

Figure 26:
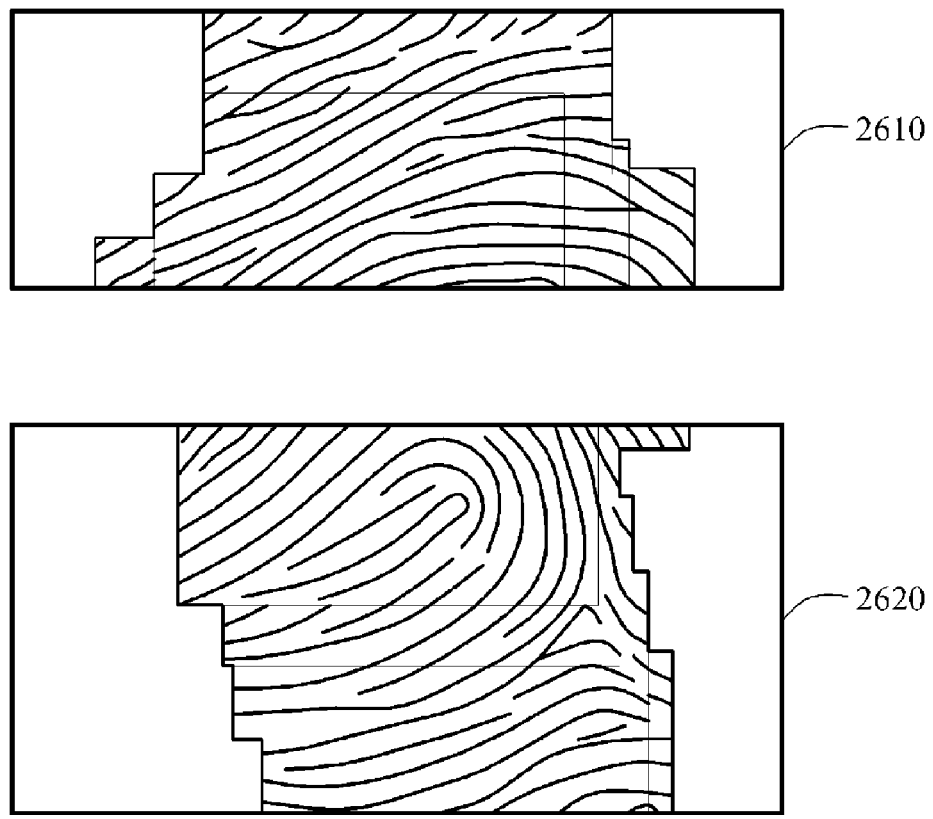

In still another example, referring to FIG. 26, stitched images 2610 and 2620 corresponding to a plurality of regions may be stored. Here, each of the regions may be a region mainly used for fingerprint recognition.

Figure 27:
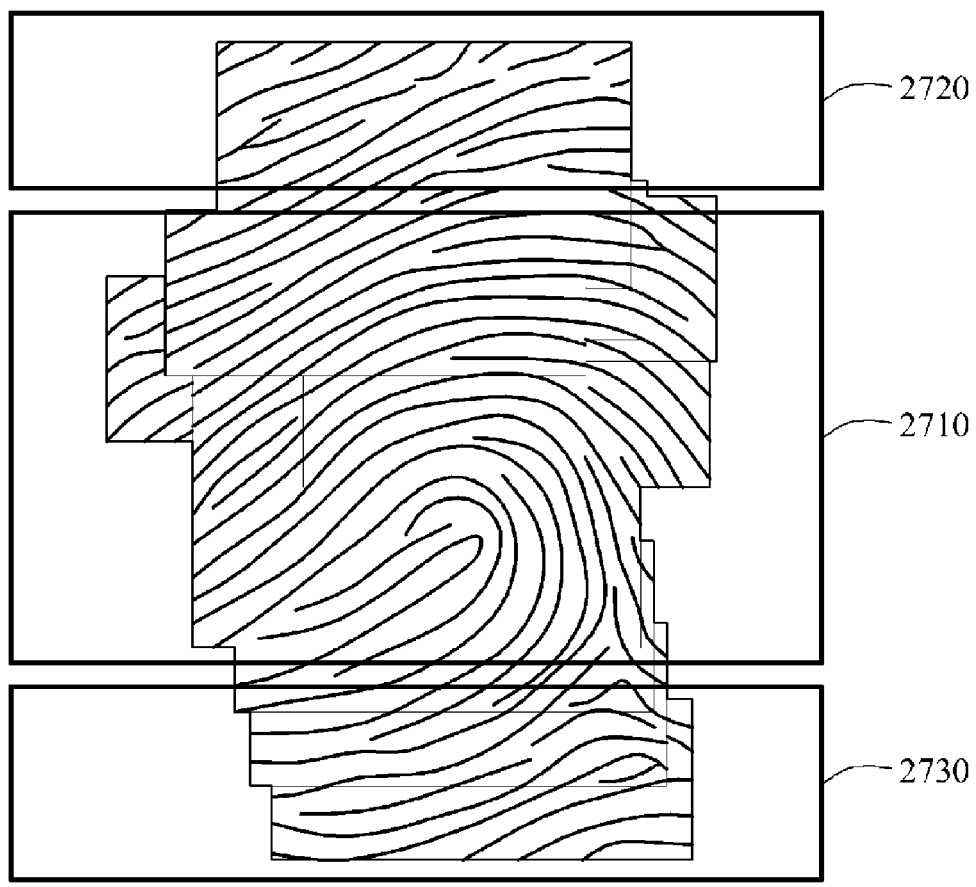

In yet another example, referring to FIG. 27, a stitched image 2710 corresponding to a main region and stitched images 2720 and 2730 corresponding to adjacent regions may be stored. An entire stitched image 2700 may be reconstructed to allow the main region and the adjacent regions to be separated from one another. The adjacent regions may be configured with various combinations of an upward, a downward, a leftward, and a rightward direction, or a predetermined and/or desired direction.

Example embodiments described in the foregoing may be variously combined or modified for fingerprint recognition. In an example, a method of using a stitched image through the method of storing a stitching result may be combined with a method using a lookup table. In another example, verification may be performed using an enrolled image having a largest overlapping size with a query image because a loss may occur in an image due to a stitching operation. In still another example, a fingerprint may be input through sliding or touching.

When the fingerprint is input through touching, a stitching order may be determined among enrolled images based on coherence. An enrolled image having a smaller coherence may be arranged at a center of the fingerprint and placed first in the stitching order. To evaluate the coherence of the enrolled images, a directional coherence may be used. To calculate the directional coherence, orientation information including an edge or a gradient of the fingerprint may be used.

Figure 28:
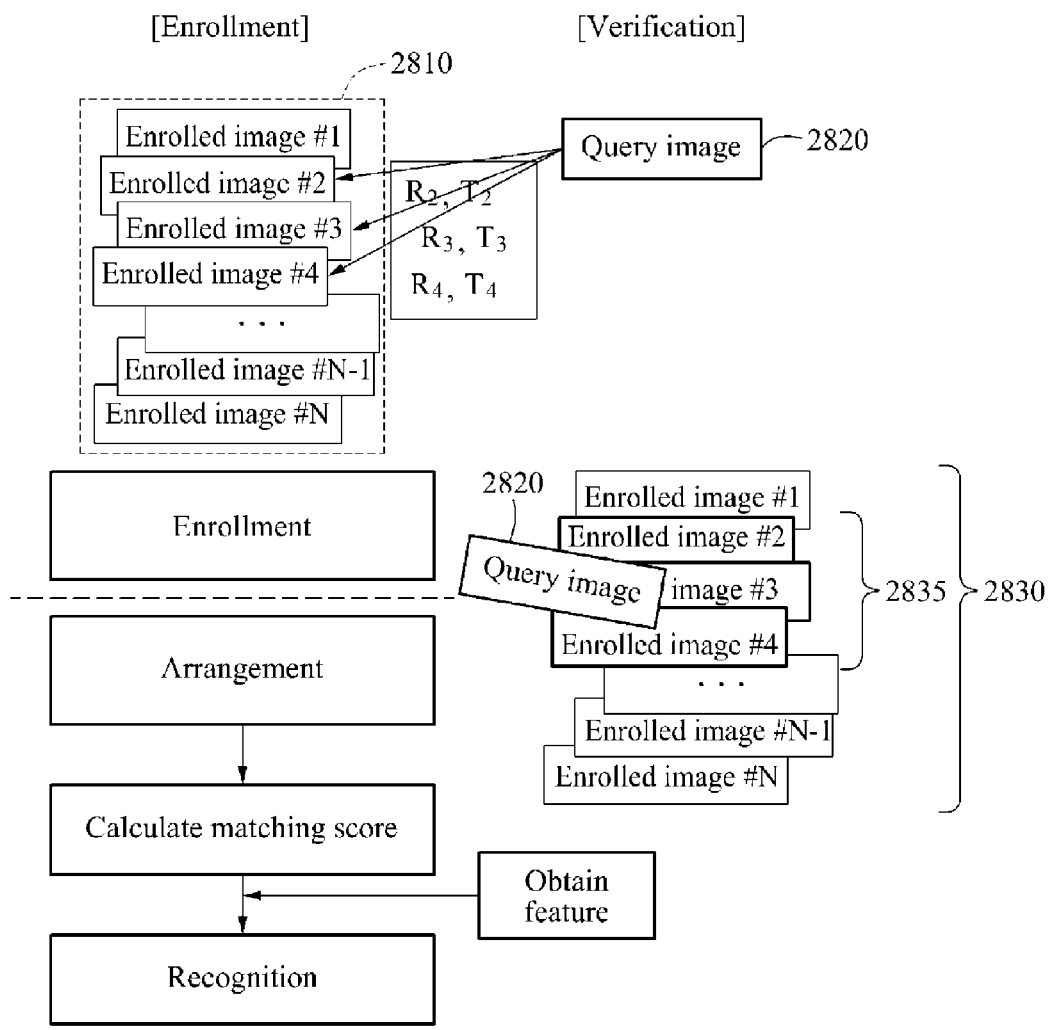

Referring to FIG. 28, in an enrollment operation, stitching is performed and a stitched image 2810 is stored. For example, the stitching may be performed using a directional coherence.

In a verification operation, candidate enrolled images 2835 are selected from among enrolled images 2830 to verify a query image 2820. For example, the method of using a lookup table or the two-stage matching method may be used to select the candidate enrolled images 2835. Here, the candidate enrolled images 2835 may be patches overlapping the query image 2820.

As illustrated in FIG. 28, "$R_i$" and "$T_i$" of the candidate enrolled images 2835 selected through arrangement or alignment may be calculated. For example, the method using a lookup table or the two-stage matching method may be used to calculate $R_i$ and $T_i$ of the candidate enrolled images 2835. According to example embodiments, a computational complexity for fingerprint recognition may be reduced by comparing the query image 2820 only to the candidate enrolled images 2835 and calculating $R_i$ and $T_i$ of the candidate enrolled images 2835.

According to example embodiments, a matching score may be calculated based on $R_i$ and $T_i$ of candidate enrolled images, and a fingerprint may be recognized. Here, a feature of a query image may be obtained through various methods for fingerprint recognition.

A Fingerprint Enrollment Sequence

A size of a sensing region of a fingerprint recognizing sensor may be smaller than a size of a fingerprint. In such a case, a plurality of enrolled images may be used to enroll the fingerprint.

Figure 29:
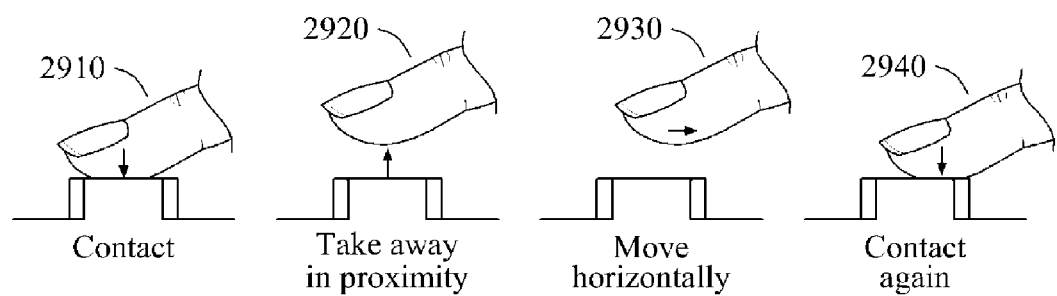
FIGS. 29 and 30 illustrate a fingerprint enrollment sequence according to example embodiments.
Figure 30:
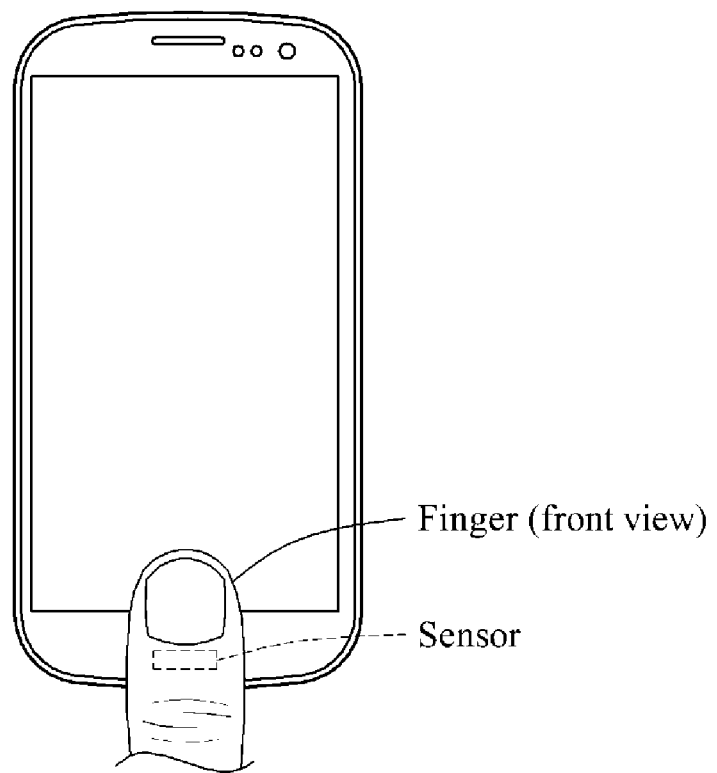

Referring to FIG. 29, in operation 2910, a first enrolled image is obtained when a finger makes contact with a sensing region of a fingerprint recognizing sensor. FIG. 29 illustrates a finger illustrated in FIG. 30 obtained by viewing the finger from a left side.

In operation 2920, the finger is separated from the sensing region within a proximity of the sensing region. In operation 2930, the finger moves horizontally. Here, a horizontal direction may be a direction parallel to the sensing region. Alternatively, operation 2920 in which the finger is separated from the sensing region within the proximity of the sensing region and operation 2930 in which the finger moves in the horizontal direction from the sensing region may be performed simultaneously.

In an example, the fingerprint recognizing sensor may perform a function as a proximity sensor. For example, when the fingerprint recognizing sensor is configured as a capacitive sensor, the fingerprint recognizing sensor may recognize a fingerprint of a finger in contact with the fingerprint recognizing sensor and also sense a movement of the finger in the proximity of the fingerprint recognizing sensor.

Alternatively, a proximity sensor may be provided separately from the fingerprint recognizing sensor. In such a case, the fingerprint recognizing sensor may recognize a fingerprint of a finger in contact with the fingerprint recognizing sensor, and the proximity sensor may sense a movement of the finger within a proximity of the proximity sensor.

In operation 2940, when the finger makes contact with the sensing region again after the finger horizontally moves within the proximity distance, a second enrolled image is obtained. A predetermined and/or selected number of enrolled images, for example, 18 enrolled images, may be obtained by repeating the operations described in the foregoing.

Although FIG. 29 illustrates a case in which the finger moves downwards within the proximity distance, movement of the finger is not limited to the downward direction. For example, the finger may move in any direction, for example, an upward, a downward, a leftward, and a rightward direction, in the fingerprint enrollment sequence.

In addition, the finger may not necessarily move in a consistent direction in the fingerprint enrollment sequence. For example, after a first enrolled image is input, the finger may move downward to input a second enrolled image. Subsequently, the finger may move in another direction, in lieu of the downward direction, to input a third enrolled image.

A Visual Guide

According to example embodiments, a visual guide may be provided to a user to assist in the fingerprint enrollment sequence described with reference to FIG. 29. For example, referring to FIG. 31, a finger-shaped visual guide 3110 may be displayed on a display. Here, a region from which an enrolled image of a fingerprint is previously obtained may be additionally displayed on the visual guide 3110. Hereinafter, the region from which the enrolled image is previously obtained will be referred to as an obtained region 3120.

A situation in which the visual guide 3110 is internally filled with obtained regions may be provided to the user in real time and thus, the user may be intuitively aware of a progress of the fingerprint enrollment sequence. Further, a portion yet to be filled in the visual guide 3110 may be a region yet to be obtained and thus, the user may be readily aware of the region yet to be obtained based on the visual guide 3110 and may input the portion.

Referring to FIG. 32, an indicator 3210 indicating a region to be obtained as a finger moves within a proximity distance may be displayed on a display. For example, when the finger moves downwards, the indicator 3210 indicating the region to be obtained may move upwards. Thus, a user may clearly recognize a region to be newly obtained.

As described with reference to FIG. 29, a movement of the finger in the proximity of a sensing region may be sensed and thus, the indicator 3210 indicating the region to be obtained may be controlled based on information on the movement of the finger.

Referring to FIG. 33, a silhouette 3310 indicating a position of a finger may be displayed on a display based on a movement of the finger within a proximity distance. For example, when the finger moves downwards, the silhouette 3310 indicating the position of the finger may also move downwards.

Referring to FIG. 34, an indicator 3210 indicating a region to be obtained as a finger moves within a proximity distance and a silhouette 3310 indicating a position of the finger may be displayed on a display. For example, when the finger moves downwards, the indicator 3210 indicating the region to be obtained may move upwards, and the silhouette 3310 indicating the position of the finger may move downwards.

Referring to FIG. 35, a visual guide 3110 and an obtained region 3120 may move in lieu of the region 3210 to be obtained. For example, when a finger moves downwards, the visual guide 3110 and the obtained region 3120 may also move downwards. Thus, a user may clearly recognize a region to be newly obtained.

As described with reference to FIG. 29, a movement of the finger in the proximity of the sensing region may be sensed and thus, the visual guide 3110 and the obtained region 3120 may be controlled based on information on the movement of the finger.

Figure 36:
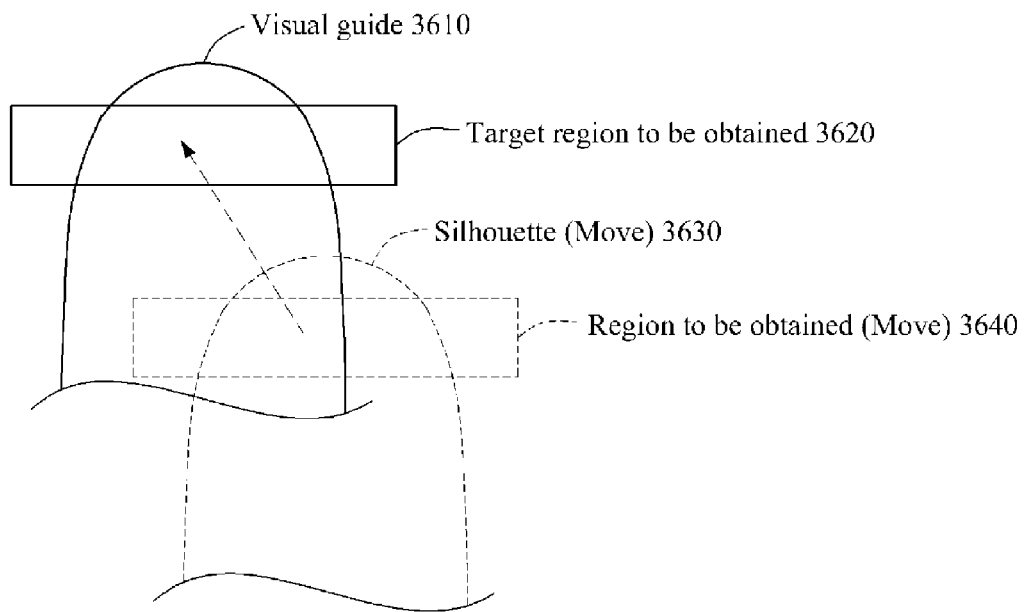

Referring to FIG. 36, a visual guide 3610 and a target region 3620 to be obtained may be displayed on a display. Further, a silhouette 3630 and a region 3640 to be obtained may move on the display based on a movement of a finger.

A user may input a fingerprint by adjusting the silhouette 3630 and the region 3640 that move along with the movement of the finger to the visual guide 3610 and the target region 3620. Thus, a required region of the fingerprint may be effectively input.

Figure 37:
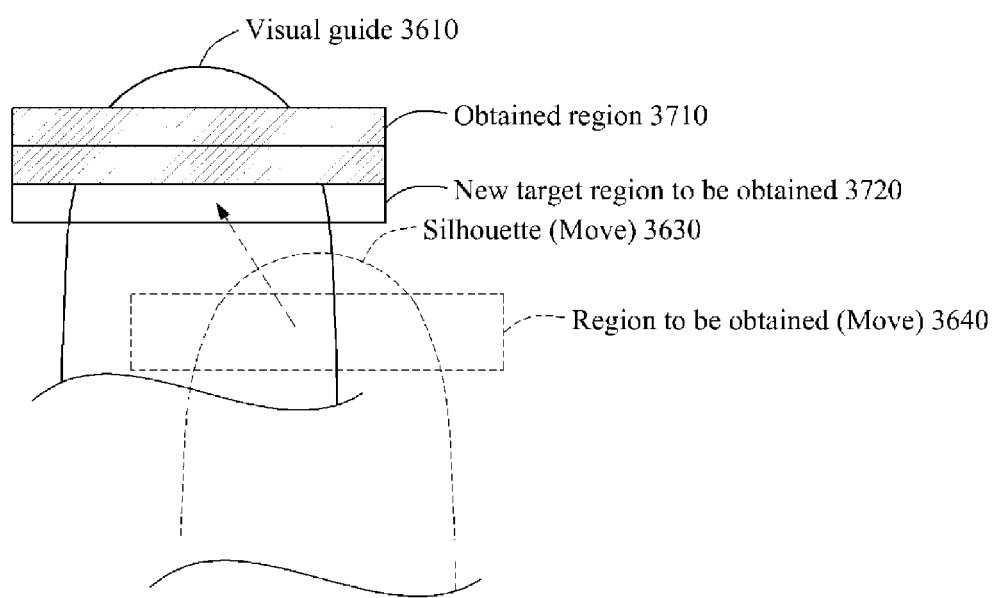

Referring to FIG. 37, an obtained region 3710 may be displayed and a new target region 3720 to be obtained may be displayed by overlapping the obtained region 3710. Thus, a position of a region 3640 to be obtained in combination with a silhouette 3630 may be modified to a position of the new target region 3720.

A user may input a fingerprint by adjusting the silhouette 3630 and the region 3640 that move along with a movement of a finger to the visual guide 3610 and the new target region 3720. Thus, enrolled images in the visual guide 3610 may be effectively input by repeating the operations described in the foregoing.

According to example embodiments, overlapping enrolled images one another may be desirable for performing stitching. Thus, a notification may be provided to a user to ensure that the user input a fingerprint to allow a region to be newly obtained to overlap an obtained region. FIG. 38 illustrates an example of overlapping a region 3810 obtained at a first point in time ($t_0$) and a region 3820 obtained at a second point in time ($t_1$). Here, "$t_1$" is greater than "$t_0$."

According to example embodiments, a size of a sensor may vary. For example, referring to FIGS. 39 through 42, a length of one side of the sensor may be longer than a breadth of a finger. Alternatively, referring to FIG. 43, the sensor may be provided in a form of a square.

Aside from the examples provided in the foregoing, the sensor may be provided in various forms, for example, a circle and a polygon, and the size of the sensor may be variously modified.

Multiview Fingerprint Enrollment

Figure 44:
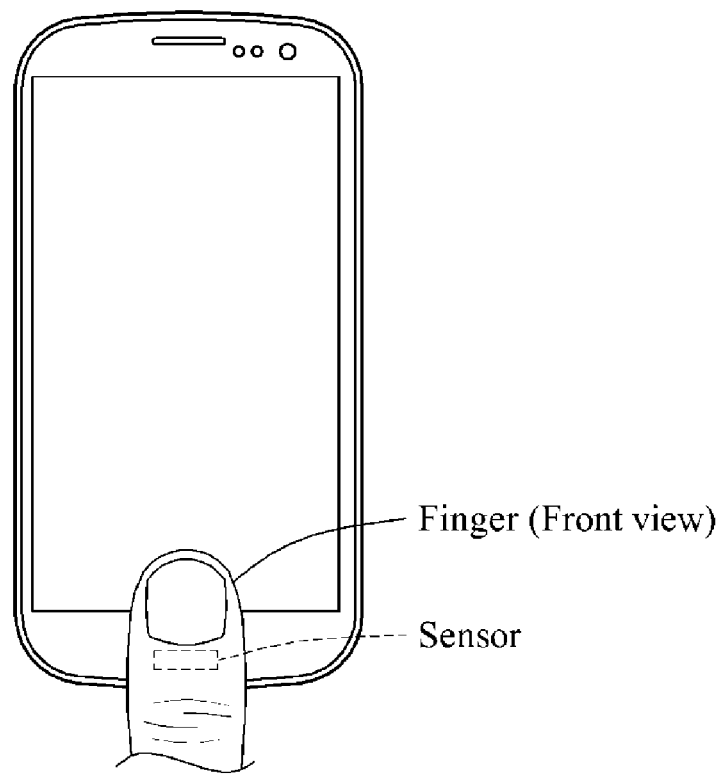
FIGS. 44 through 46 illustrate multiview fingerprint enrollment according to example embodiments.
Figure 45:
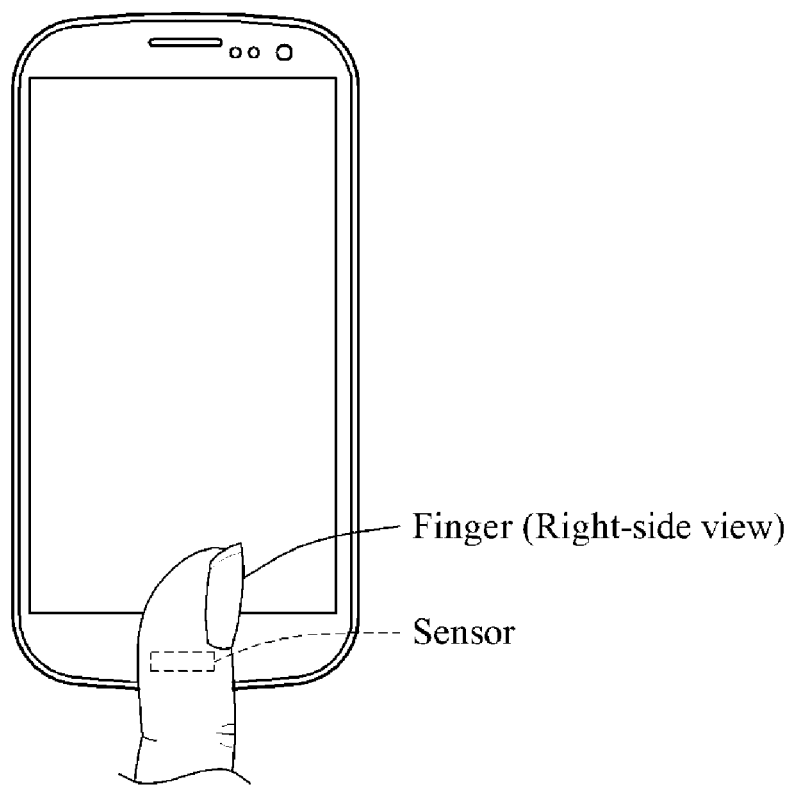
Figure 46:
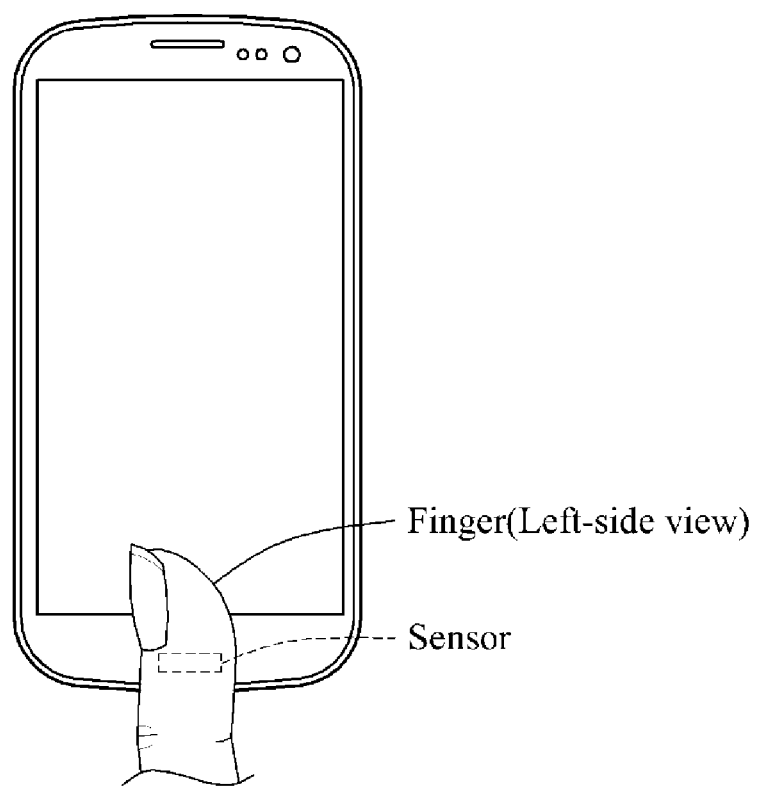

According to example embodiments, a multiview fingerprint may be enrolled. For example, referring to FIG. 44, a front view fingerprint may be enrolled. Referring to FIG. 45, a right-side view fingerprint may be enrolled. Referring to FIG. 46, a left-side view fingerprint may be enrolled. The front view fingerprint, the right-side view fingerprint, and the left-side view fingerprint may be enrolled using a plurality of enrolled images in accordance with the methods described with reference to FIGS. 29 through 43.

According to example embodiments, a guide user interface (UI) may be provided to a user to enroll the multiview fingerprint. For example, a UI instructing a rightward tilt of a finger may be provided to the user to enroll the right-side view fingerprint. Alternatively, a UI instructing a leftward tilt of the finger may be provided to the user to enroll the left-side view fingerprint.

Multi-angle Fingerprint Enrollment

Figure 47:
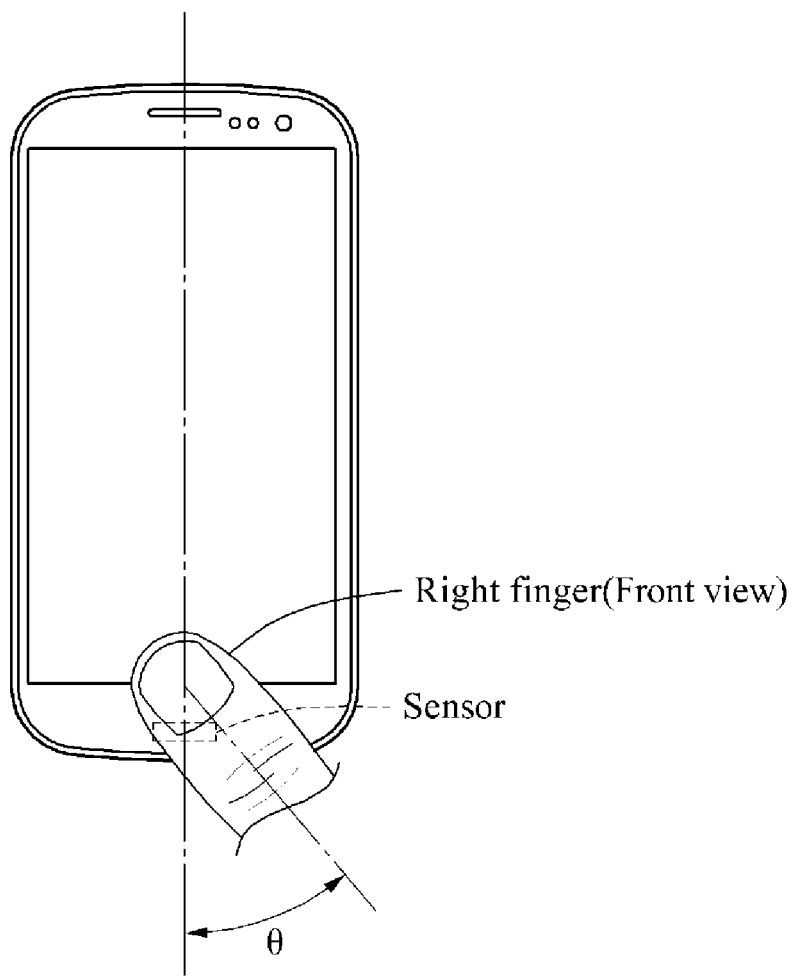
FIGS. 47 through 52 illustrate multiangle fingerprint enrollment according to example embodiments.
Figure 48:
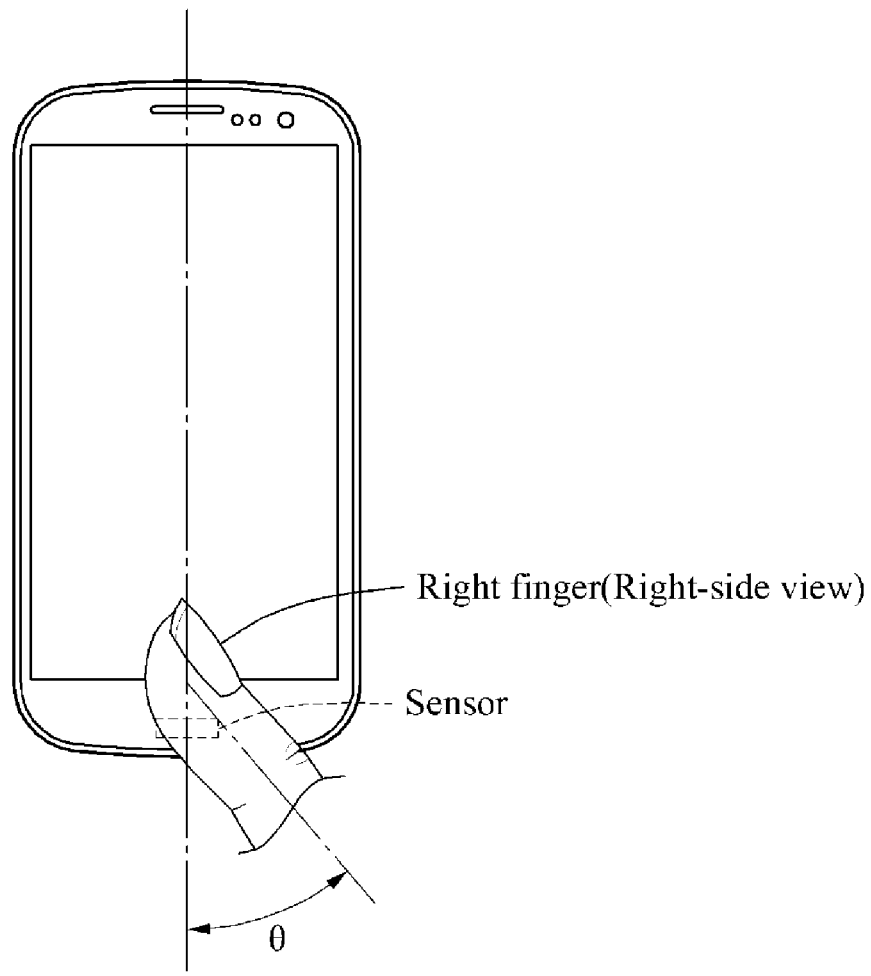
Figure 49:
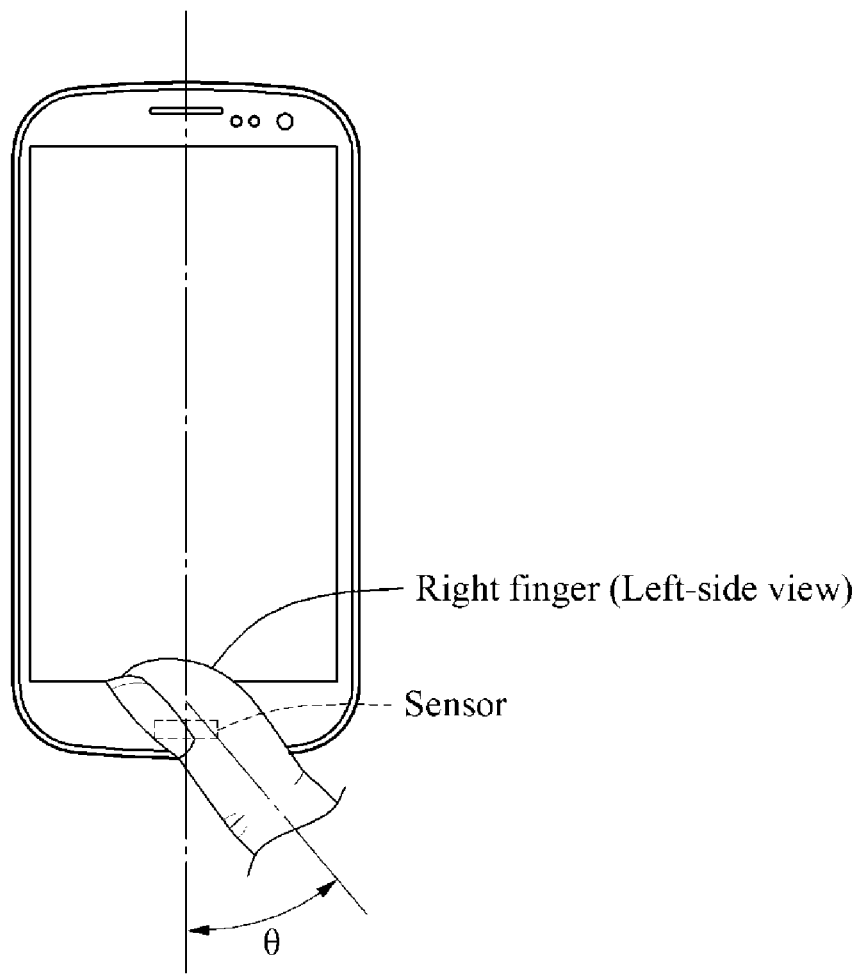
Figure 50:
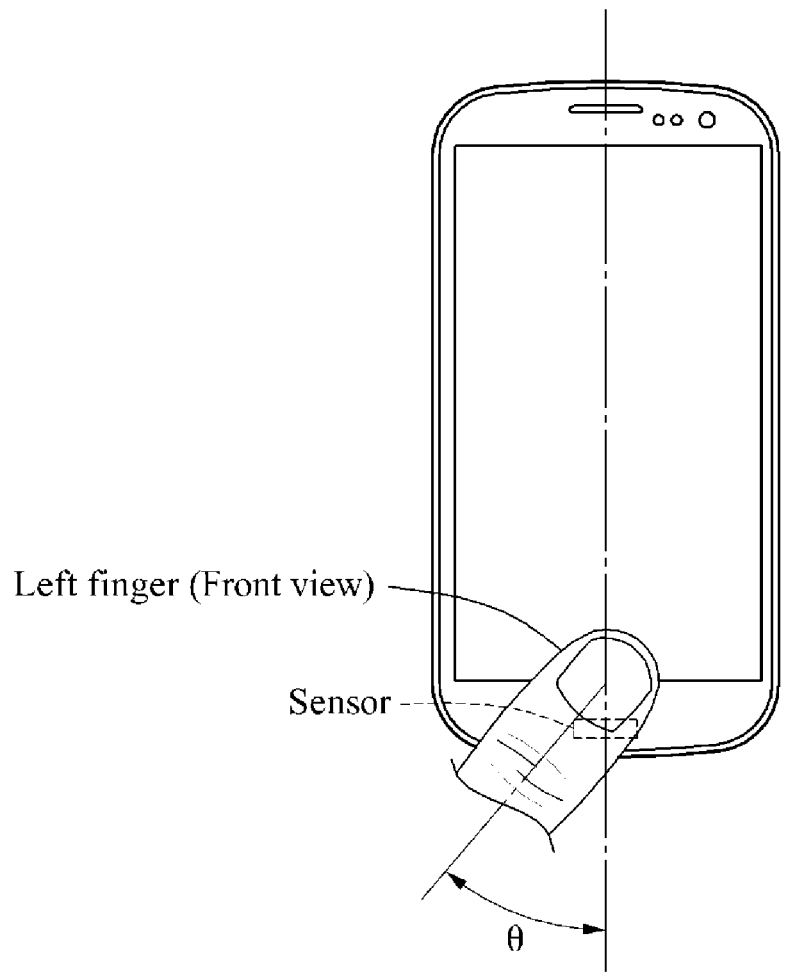
Figure 51:
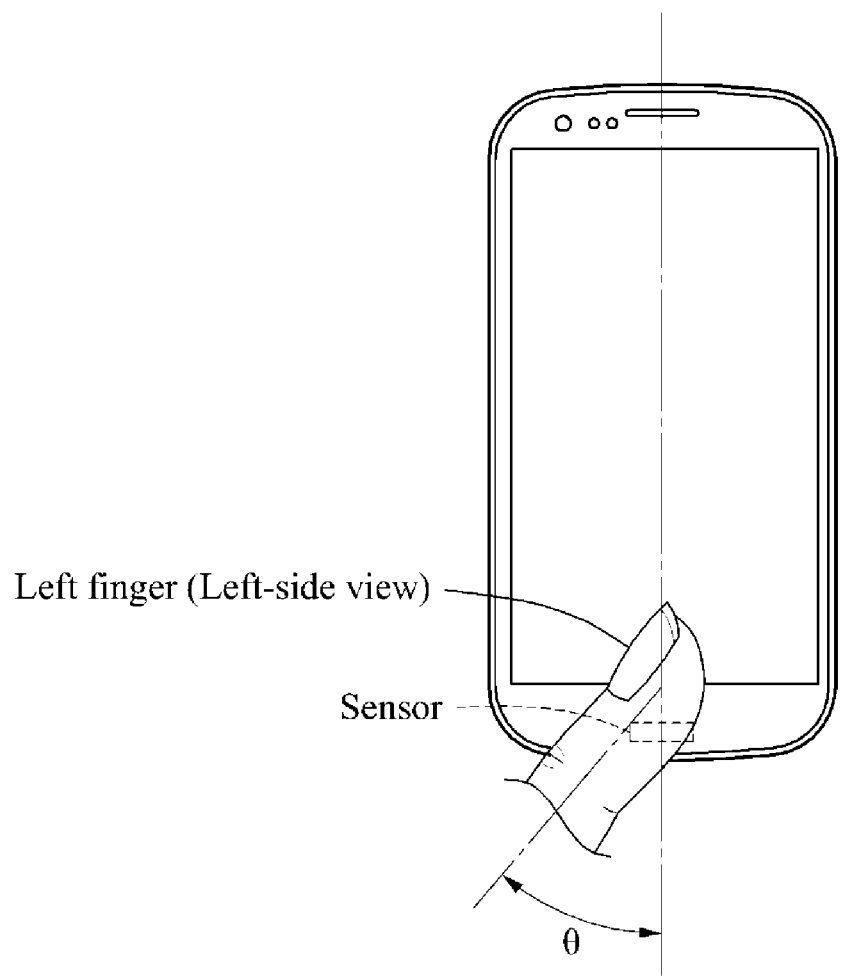
Figure 52:
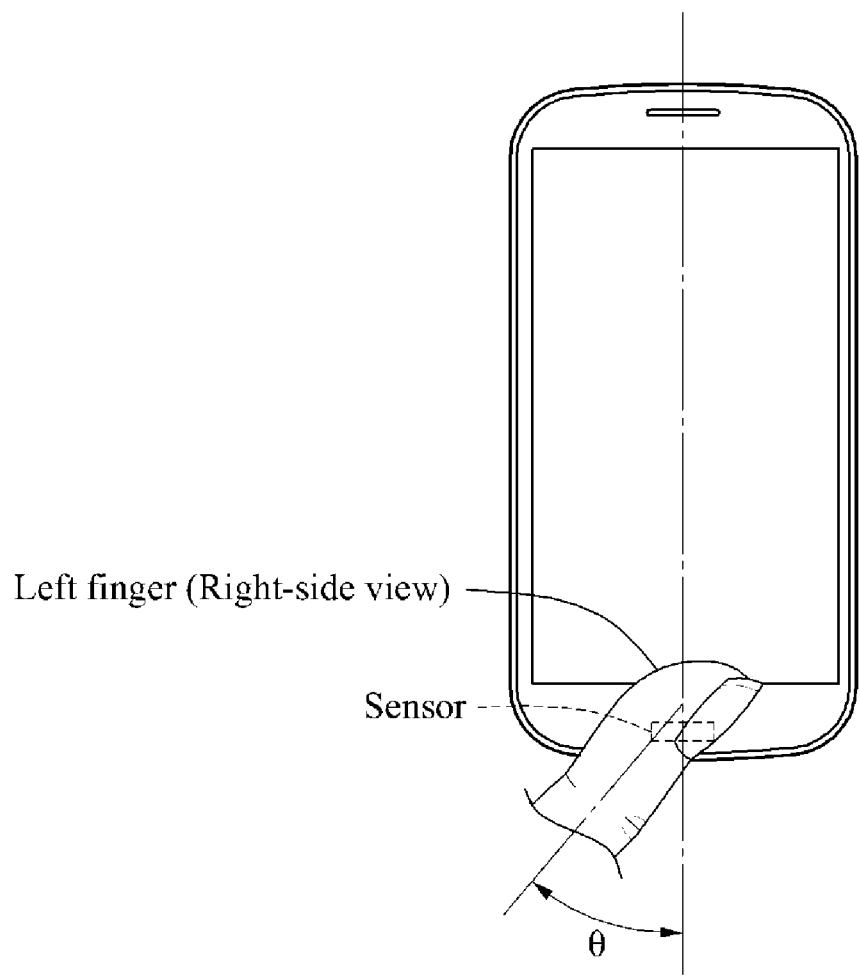

According to example embodiments, a multi-angle fingerprint may be enrolled. For example, referring to FIG. 47, a front view fingerprint may be enrolled at various angles. Referring to FIG. 48, a right-side view fingerprint may be enrolled at various angles. Referring to FIG. 49, a left-side view fingerprint may be enrolled at various angles According to example embodiments, a multi-angle fingerprint of a left finger may be enrolled in accordance with the identical method described in the foregoing. For example, referring to FIGS. 50 through 52, a front view fingerprint, a left-side view fingerprint, and a right-side view fingerprint may be enrolled at various angles.

Each of the front view fingerprint, the right-side view fingerprint, and the left-side view fingerprint of the right finger and the left finger at various angles may be enrolled using a plurality of enrolled images in accordance with the methods described with reference to FIGS. 29 through 43.

A Method of Generating a Stitched Image

Figure 53:
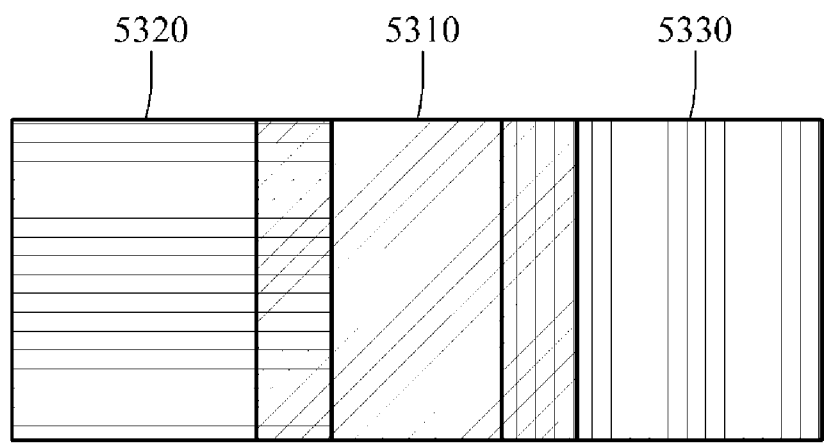
FIGS. 53 through 56 illustrate a method of generating a stitched image according to example embodiments.

According to example embodiments, a method of generating a stitched image using a front view, a left-side view, and a right-side view may be variously modified. For example, referring to FIG. 53, a stitched image may be generated using all of a front view 5310, a left-side view 5320, and a right-side view 5330.

Figure 54:
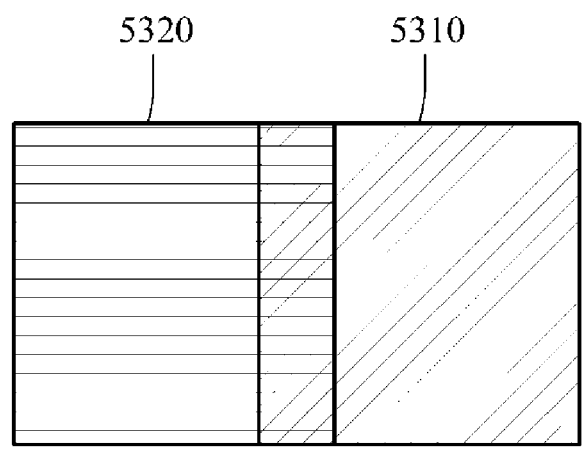

Referring to FIG. 54, a stitched image may be generated using the front view 5310 and the left-side view 5320. For example, when a user is left-handed, the user may input a fingerprint using a left thumb while holding a portable device with a left hand. In such an example, the stitched image generated using the front view 5310 and the left-side view 5320 may be used for fingerprint recognition.

Figure 55:
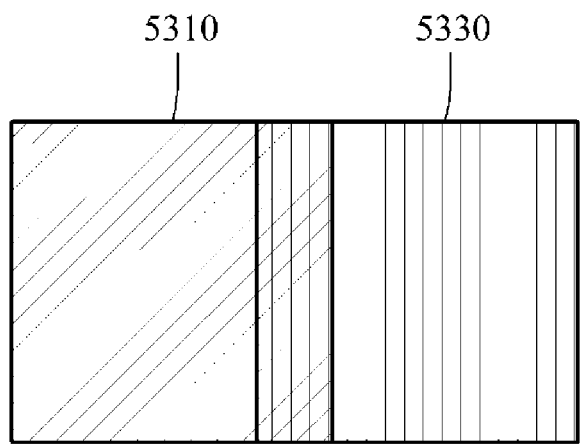

Referring to FIG. 55, a stitched image may be generated using the front view 5310 and the right-side view 5330. For example, when a user is right-handed, the user may input a fingerprint using a right thumb while holding a portable device with a right hand. In such an example, the stitched image generated using the front view 5310 and the right-side view 5330 may be used for fingerprint recognition.

Figure 56:
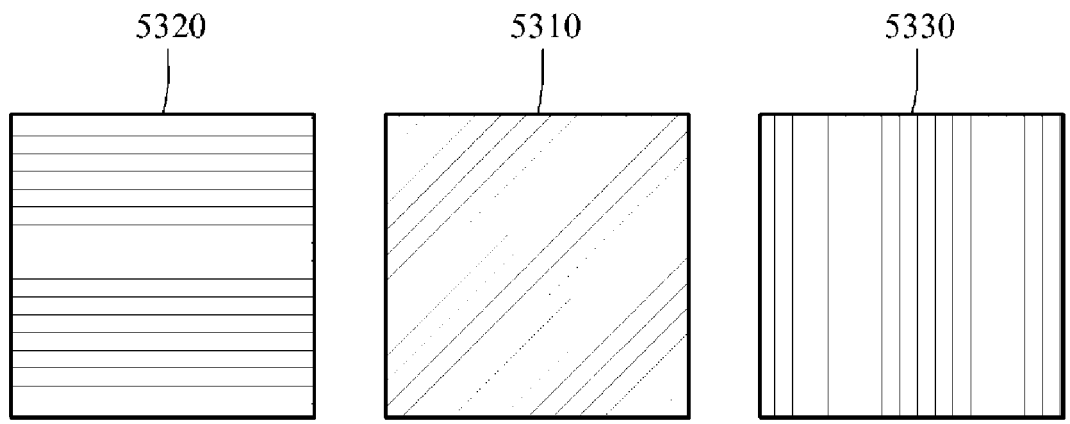

Referring to FIG. 56, a stitched image for each of the front view 5310, the left-side view 5320, and the right-side view 5330 may be generated.

According to circumstances, a stitched image only for the front view 5310, a stitched image only for the left-side view 5320, or a stitched image only for the right-side view 5330 may be generated. Alternatively, stitched images may be generated by a combination of at least two of the stitched image for the front view 5310, the stitched image for the left-side view 5320, and the stitched image for the right-side view 5330.

When a multiview fingerprint is enrolled at multi-angles, the method of generating a stitched image described with reference to FIGS. 53 through 56 may be applied at each angle. For example, a first stitched image may be generated using the front view 5310, the left-side view 5320, and the right-side view 5330 at 0°. Similarly, a second stitched image may be generated using the front view 5310, the left-side view 5320, and the right-side view 5330 at 20°.

When at least one stitched image is generated using the method of generating a stitched image described with reference to FIGS. 53 through 56, a codebook corresponding to the generated stitched image may be generated. The generated codebook may be used in a verification operation.

A Bioinformation Processing Module

Figure 57:
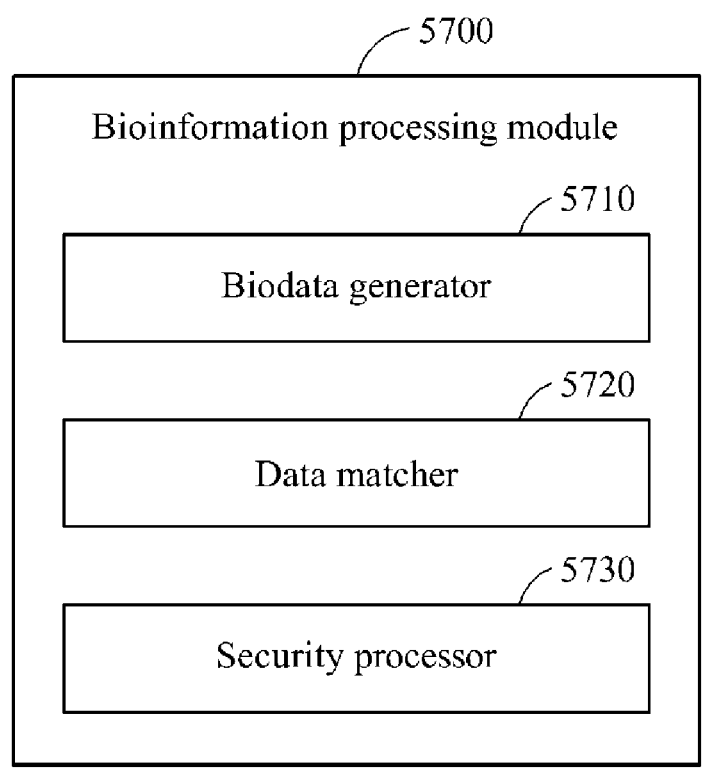
FIG. 57 illustrates a configuration of a bioinformation processing module according to example embodiments.

FIG. 57 is a block diagram illustrating an example of a bioinformation processing module 5700 according to example embodiments. Referring to FIG. 57, the bioinformation processing module 5700 in a secure region includes a biodata generator 5710, a data matcher 5720, and a security processor 5730.

The biodata generator 5710 may obtain unique feature information on a feature unique to an object to be recognized based on sensing data obtained by a bio-sensing module. The biodata generator 5710 may generate biodata by converting the obtained unique feature information to a template.

The biodata generator 5710 may obtain a bio-image, for example, a fingerprint image, an iris image, and a face image, from the sensing data. For example, the bio-image may be obtained using an optical method using reflection of light or a non-optical method using pressure, heat, ultrasonic waves, and the like. The biodata generator 5710 may extract the unique feature information of an individual based on the bio-image. For example, feature information for fingerprint recognition may be minutia, for example, ridge endings, bifurcations, a core point, and delta points. The feature information may be obtained in a predetermined and/or desired format or a frame to verify a degree of matching between the feature information and stored enrolled biodata. For example, a form of information in the predetermined and/or desired format may be a template.

When a request for enrolling bioinformation, also referred to as a bioinformation enrollment request, is detected, the biodata generator 5710 may store the generated biodata as enrolled information in a memory. Here, the bioinformation enrollment request may be made through a security signal transmitted from a general region.

When a request for bio-recognition, also referred to as a bio-recognition request, is detected, the data matcher 5720 may determine whether bio-authentication data input for the bio-recognition matches the stored enrolled biodata. Here, the bio-recognition request may be made through a security signal transmitted from the general region.

The data matcher 5720 may compare the feature information obtained from the bio-authentication data input for the bio-recognition to at least one set of the enrolled data, and obtain a matching value. Here, the matching value may be a value indicating information as to whether the bio-authentication data matches the enrolled biodata.

For example, when performing data matching, the matching value may be obtained as a value indicating a number of feature points determined to be corresponding to or matching one another among feature points included in each set of the biodata. Alternatively, the matching value may be obtained based on statistical data or a probabilistic function, in consideration of a distance between the feature points included in each set of the biodata and a similarity in a form of arrangement of the feature points.

The data matcher 5720 may determine whether the bio-authentication is successful based on the matching value of the feature information. For example, when the matching value exceeds a predetermined and/or selected threshold value, the data matcher 5720 may determine that the bio-authentication is successful. Conversely, when the matching value is less than or equal to the predetermined and/or selected threshold value, the data matcher 5720 may determine that the bio-authentication is unsuccessful.

The data matcher 5720 may allow information on a result of whether the bio-authentication is successful, for example, a true-and-false type signal, to be transmitted to a bio-recognition function control module in the general region.

The security processor 5730 may allow the biodata to be encoded and decoded. The security processor 5730 may generate a unique key based on unique identification information of a device. For example, the unique key may be an accessible value in a secure mode.

When enrolling the bioinformation, the security processor 5730 may encode the biodata using the unique key, and control the encoded biodata to be stored in the secure region of the memory. When performing the bio-recognition, the security processor 5730 may obtain the encoded biodata from the secure region of the memory, and decode the biodata using the unique key. The security processor 5730 may transmit the decoded biodata to the data matcher 5720. In such a case, a function used to generate the unique key may be a value that may be generated during an operation as a virtual security core system, and access may be restricted during an operation as a general security core system.

The security processor 5730 may encode the biodata using the unique key and control the encoded biodata to be transmitted to the bio-recognition function control module in the general region. When performing the bio-recognition, the security processor 5730 may receive the encoded biodata from the bio-recognition function control module in the general region, and decode the encoded biodata using the generated unique key in the secure mode. The security processor 5730 may transmit the decoded biodata to the data matcher 5720.

The security processor 5730 may transform the biodata using a transform function to generate pseudo data. The transform function may include, for example, a one-way function and a data arrangement function. In addition, a function using a value that may be obtained in the secure mode or additional security hardware may be used. The transform function may be stored as metadata of the biodata.

The security processor 5730 may transmit the generated pseudo data to the data matcher 5720 and the data generator 5710. For example, the data generator 5710 may store the pseudo data as enrolled information. The data matcher 5720 may determine whether the bio-authentication is successful by comparing the pseudo data to newly generated pseudo data.

The security processor 5730 may variably operate the transform function used for generating the pseudo data. For example, when the bio-recognition information is unintentionally exposed, the security processor 5730 may change the transform function and newly generate pseudo data using the changed transform function. When externally exposed, metadata of the biodata may also be updated and thus, the security processor 5730 may update or discard the previous biodata.

According to example embodiments, an electronic device that may operate in a general region and a secure region through a single processor may include a biosensor module used for bio-recognition, and a processor configured to perform control to detect a bioinformation input event from the biosensor module in the general region, transmit the bioinformation input event from the general region to the secure region, obtain sensing data from the biosensor module in response to the bioinformation input event in the secure region, process the obtained sensing data in the secure region, and transmit information on a result of enrolling the bioinformation and information on a result of the bio-recognition to the general region.

The processor may perform control to obtain feature information from the sensing data in the secure region, generate biodata based on the feature information, encode the biodata using a unique key generated based on unique identification information, and enroll the encoded biodata as the bioinformation.

The processor may transmit the encoded biodata to the general region and store the encoded biodata in the general region.

The processor may obtain encoded enrolled data from a memory allocated to the secure region or the general region, decode the encoded enrolled data using the unique key generated based on the unique identification information, and perform bio-authentication by comparing the decoded enrolled data to the generated biodata. When a data matching value exceeds a predetermined and/or selected threshold value as a result of the comparing, the processor may determine that the bio-authentication is successful. Conversely, when the data matching value is less than or equal to the predetermined and/or selected threshold value, the processor may determine that the bio-authentication is unsuccessful.

The processor may transmit a true-and-false type signal corresponding to a result of the enrollment or the recognition.

A Bioinformation Enrollment Method

Figure 58:
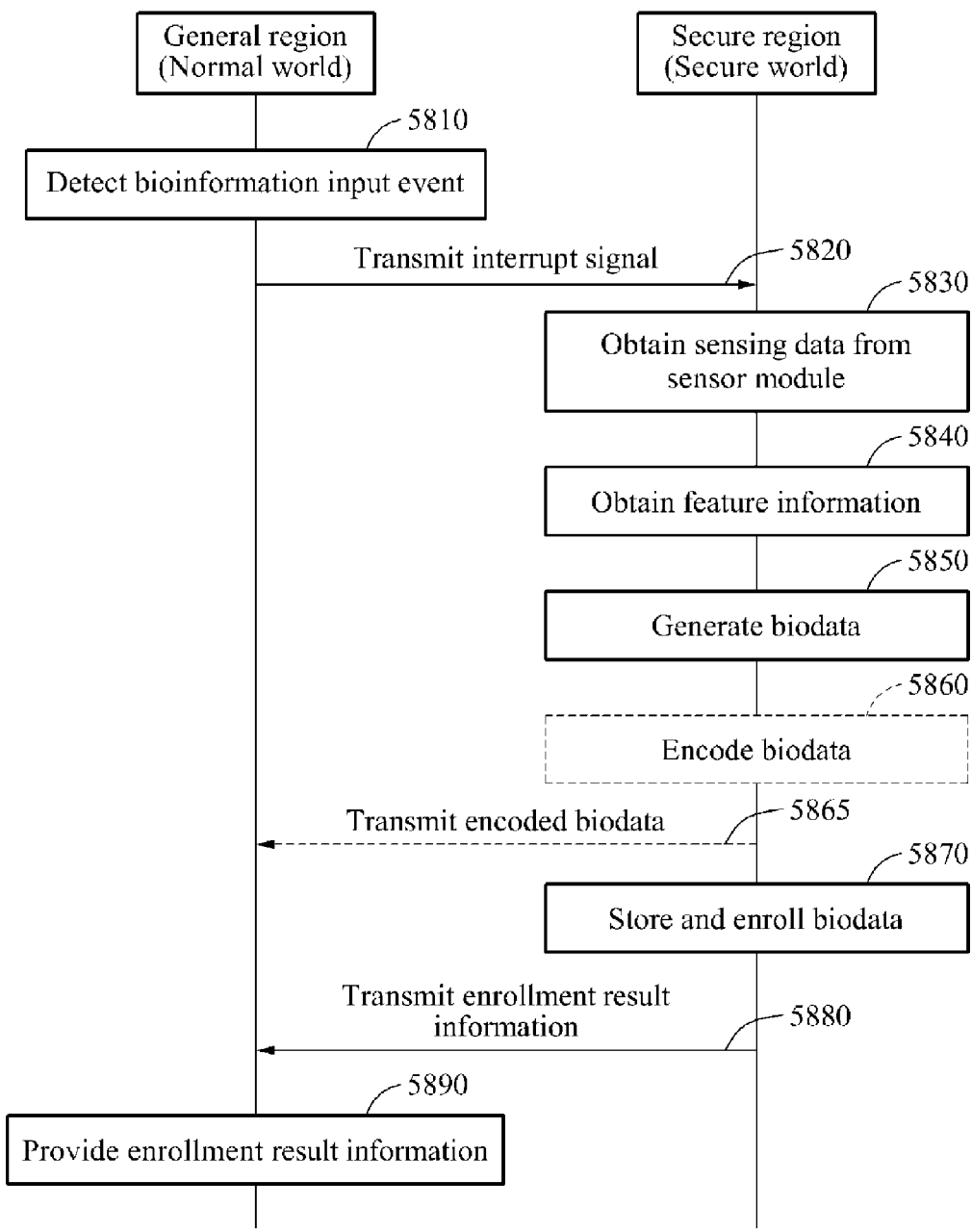
FIG. 58 illustrates a bioinformation enrollment method according to example embodiments.

FIG. 58 illustrates a bioinformation enrollment method of an electronic device according to example embodiments. Referring to FIG. 58, in operation 5810, a processor detects a bioinformation input event based on an interrupt signal to be transmitted from a biosensor module in a general region, for bioinformation enrollment, for example, an enrollment mode. In the general region, when a request for a function for the bioinformation enrollment occurs, the processor may activate the biosensor module and sense a sensing object using the biosensor module. For example, the electronic device may recognize a motion performed by a user bringing a finger of the user into contact with a fingerprint sensor by using the sensor. The electronic device may recognize a motion performed by the user placing eyes close to an iris sensor by using the sensor. The electronic device may recognize a motion performed by the user placing a hand close to a vein sensor by using the sensor. The electronic device may recognize a motion performed by the user inputting a voice by using a voice sensor. The electronic device may recognize a motion performed by the user placing a face of the user close to a face sensor by using the sensor.

In operation 5820, when the bioinformation input event is detected, the processor transmits, to a secure region, an event detection signal to invoke a virtual security core system. The event detection signal may be a security interrupt signal.

In operation 5830, the processor in the secure region obtains the sensing data from the biosensor module. The sensing data may be raw data of bio information. For example, the sensing data may include at least one of a fingerprint, a hand pattern, a retina pattern, an iris pattern, an ear shape, a face shape, a voice, and a penmanship of the user.

In operation 5840, the processor in the secure region obtains unique feature information unique to an object to be recognized based on the sensing data. For example, the processor may obtain a sensing image from the sensing data and extract feature information from the sensing image.

In operation 5850, the processor in the secure region generates biodata by converting the feature information to a form of a template In operation 5860, the processor in the secure region encodes the biodata. For example, the processor may generate a unique key based on unique identification information unique to the electronic device in the secure region. The unique key may be an accessible value in the secure mode. For example, the processor may store function information used to generate the unique key in a memory allocated to the secure region, and generate the unique key using the function information in the secure mode. Alternatively, operation 5860 may be omitted, but not limited thereto.

In operation 5865, the processor in the secure region transmits the encoded biodata to the general region. For example, the processor in the general region may store the encoded biodata in a memory allocated to the general region, for example, a rich execution environment (REE) file system In operation 5870, the processor in the secure region stores and enrolls the biodata or the encoded biodata as enrolled information for bio-recognition.

In an example, the processor may store and enroll the biodata in an accessible secure region in the secure mode.

In an example, the processor may store the unique key used for the encoding or the function information used for generating the unique key in the accessible secure region in the secure mode, and transmit the encoded biodata to the general region. The processor in the general region may store and enroll, in an unlimitedly accessible general region, the encoded biodata transmitted from the secure region.

In operation 5880, the processor in the secure region transmits a result of bioinformation enrollment to the general region. In operation 5890, the processor in the general region provides the user with information on completion of the bioinformation enrollment via a virtual general core using a UI or a component of the electronic device.

When the bioinformation enrollment is unsuccessful due to deterioration in a quality of the raw data, the processor may allow a re-enrollment procedure to be performed. To this end, the processor in the general region may control at least one of feedback, for example, visual and acoustic effects, on a failure in the enrollment and new sensing data to be provided through the UI.

A Bioinformation Authentication Method

Figure 59:
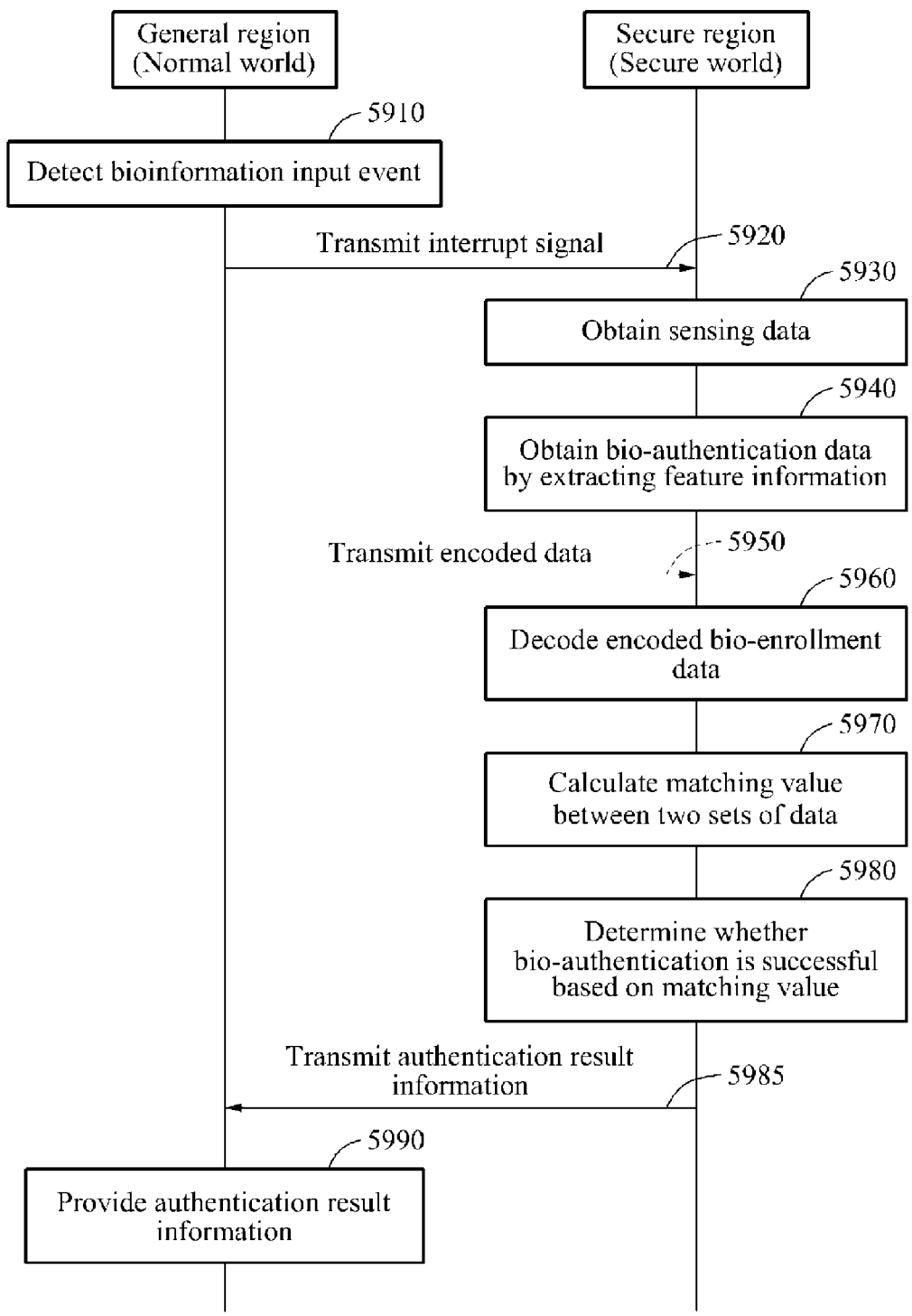

FIG. 59 illustrates a bioinformation authentication method according to example embodiments. Referring to FIG. 59, in operation 5910, for bio-authentication (for example, an authentication mode), a processor detects a bioinformation input event based on an interrupt signal to be transmitted from a biosensor module in a general region. When a request for a function for the bio-authentication occurs, the processor in the general region may activate the biosensor module and sense a sensing object using the biosensor module.

In operation 5920, when the bioinformation input event is detected, the processor in the general region transmits an event detection signal to a secure region. The event detection signal may be a security interrupt signal.

In operation 5930, the processor in the secure region obtains sensing data from the biosensor module. In operation 5940, the processor in the secure region obtains unique feature information unique to an object to be recognized based on the sensing data, and generates bio-authentication data for the bio-authentication. The bio-authentication data may be provided in a predetermined and/or desired format, for example, a template.

In operation 5950, the processor in the secure region receives encoded enrolled biodata, for example, bio-enrollment data, from the general region or obtains the encoded enrolled biodata from a memory allocated to the secure region In operation 5960, the processor in the secure region decodes the stored enrolled biodata, for example, encoded biodata. For example, when the encoded biodata is obtained, the processor in the secure region may decode the encoded biodata using a unique key. The processor may obtain function information for generating the unique key from a memory allocated to a limitedly accessible secure region, and generate the unique key using the obtained function information.

In operation 5970, the processor in the secure region calculates a matching value by comparing sets of the feature information obtained from the bio-authentication data and the enrolled biodata.

In operation 5980, the processor in the secure region determines whether the bio-authentication is successful based on the matching value of the feature information. For example, when the matching value exceeds a predetermined and/or selected threshold value, the processor may determine that the bio-authentication is successful. Conversely, when the matching value is less than or equal to the predetermined and/or selected threshold, the processor may determine that the bio-authentication is unsuccessful.

In operation 5985, the processor in the secure region transmits a result of the bio-authentication to the general region. In operation 5990, the processor in the general region provides the result of the bio-authentication to the user through a UI or a component of the electronic device.

When bioinformation recognition is unsuccessful due to deterioration in a quality of raw data, the processor may allow a re-recognition procedure to be performed. The processor in the general region may control at least one of feedback, for example, visual and acoustic effects, on a failure in the recognition and new sensing data to be provided through the UI.

Figure 60:
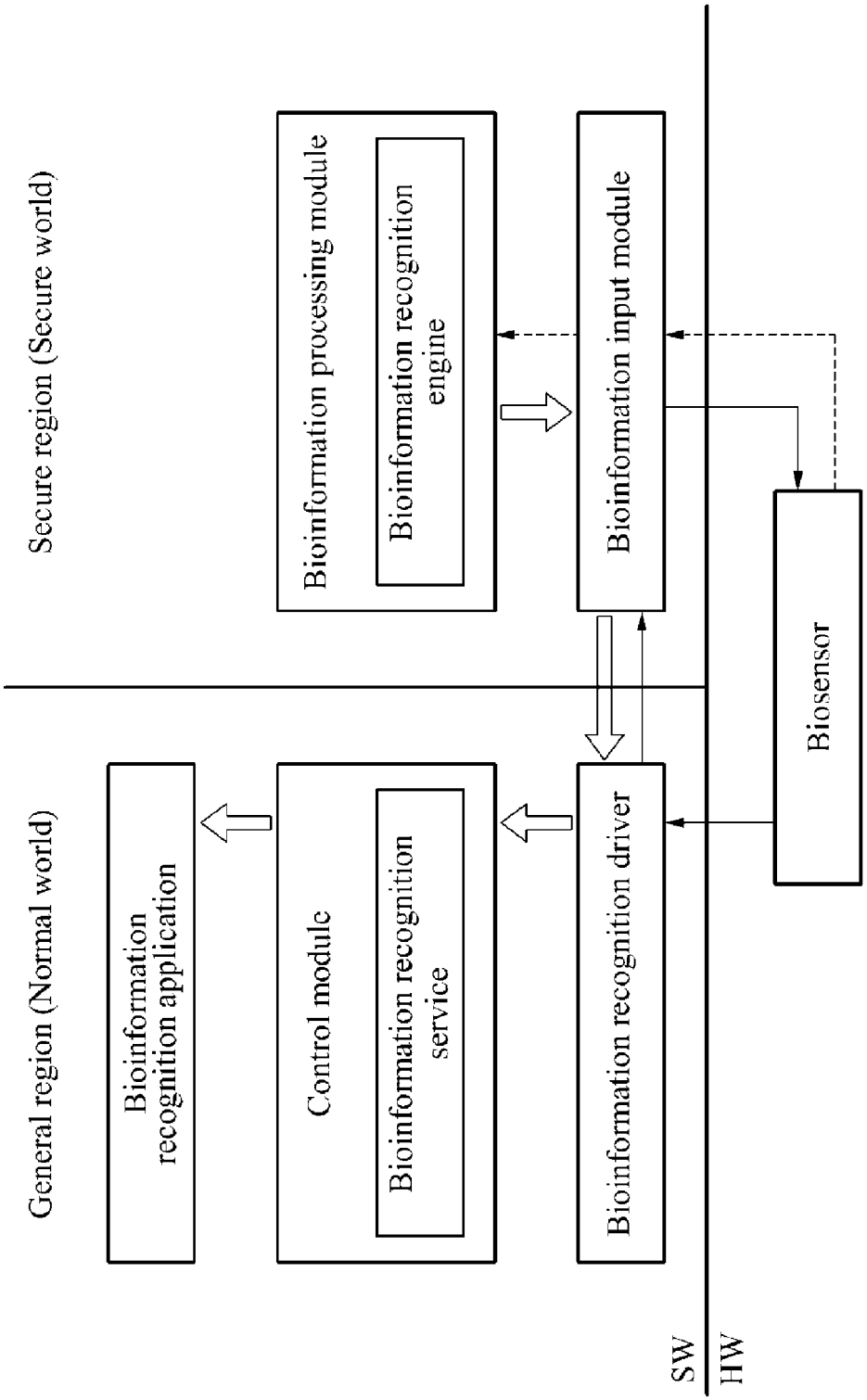

Referring to FIG. 60, an operating system (OS) is divided into a general region (or a normal world as illustrated in FIG. 60) and a secure region (or a secure world as illustrated in FIG. 60). The secure region may be a trusted region. A bioinformation recognition engine may be included in the secure region of the OS.

When a signal is received from a biosensor, a bioinformation recognition driver may inform a bioinformation input module that the signal is received from the biosensor. The bioinformation input module may read the signal from the biosensor. The bioinformation recognition engine in a bioinformation processing module may perform a fingerprint enrollment algorithm and/or a fingerprint recognition algorithm.

The bioinformation input module may transmit, to the bioinformation recognition driver, a result of the fingerprint enrollment algorithm and/or the fingerprint recognition algorithm. A bioinformation recognition application may provide a bioinformation recognition service based on the result output from the secure region.

Figure 61:
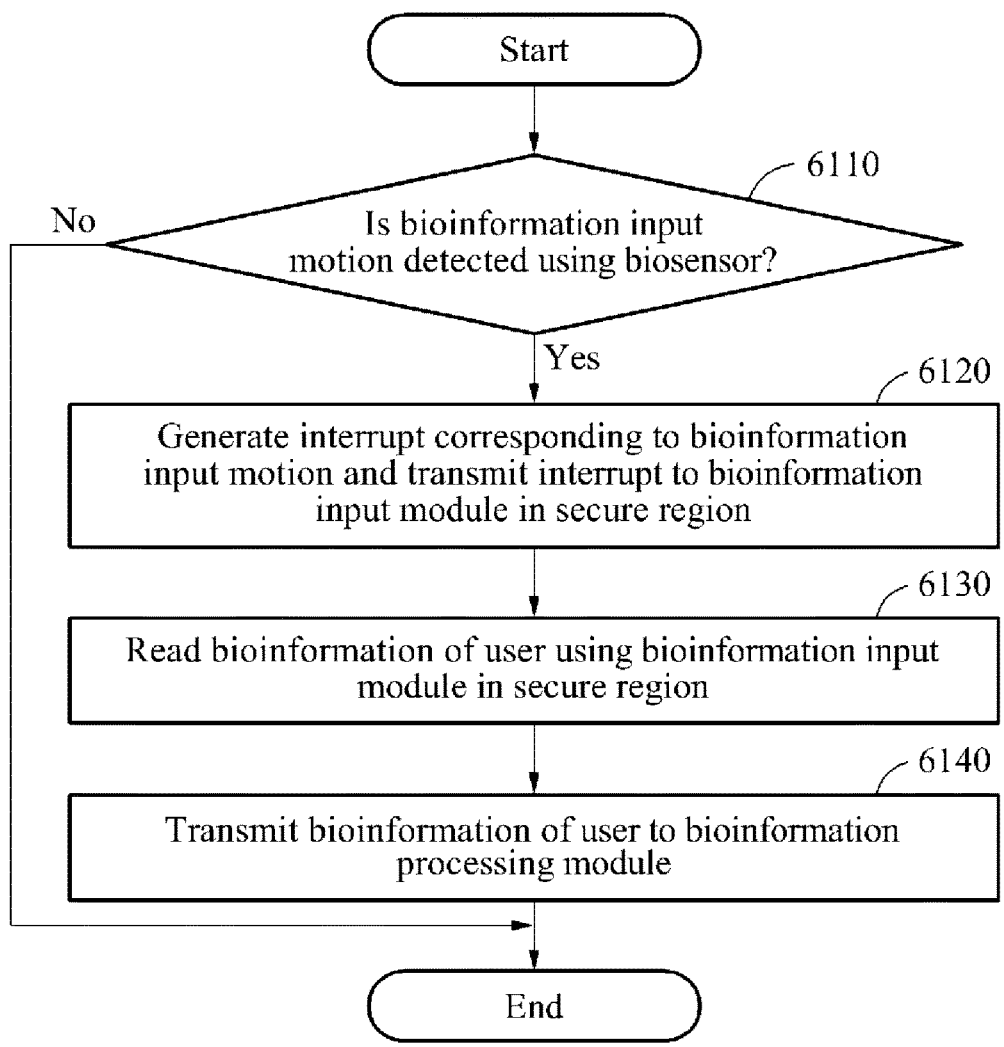

FIG. 61 illustrates an operating method of an OS according to example embodiments. Referring to FIG. 61, the method includes operation 6110 of detecting a bioinformation input motion using a biosensor, operation 6120 of generating an interrupt in response to the bioinformation input motion and transmitting the interrupt to a bioinformation input module in a secure region, operation 6130 of reading bioinformation of a user using the bioinformation input module in the secure region, and operation 6140 of transmitting the bioinformation of the user to a bioinformation processing module.

Referring to FIG. 62, a secure region includes a bioinformation input module, and a general region includes a bioinformation recognition engine.

The units and/or modules (e.g., the bioinformation processing module 5700, the biodata generator 5710, the data matcher 5720, the security processor 5730, the bioinformation recognition application, the control module, the bioinformation recognition driver and the bioinformation input module) described herein may be implemented using hardware components and/or hardware executing software components as special purpose computers. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fingerprint recognition method, comprising:
receiving a query image, the query image corresponding to at least a portion of a fingerprint;
dividing the query image into a plurality of blocks;
generating a code element for each of the plurality of blocks based on a feature of the respective block;
determining a code corresponding to the query image by combining the code elements;
obtaining information corresponding to the code from a lookup table, the information being one of a set number of candidate enrolled images and a set number of candidate regions for the query image; and
verifying the query image based on the obtained information corresponding to the code.

2. The fingerprint recognition method of claim 1, wherein the feature comprises at least one of a main direction, a secondary direction, a directional coherence, presence and an intensity of the fingerprint.

3. The fingerprint recognition method of claim 1, wherein the determining comprises:

varying the code within a range; and determining the code corresponding to the query image using the varied code.

4. The fingerprint recognition method of claim 1, wherein the verifying comprises:

selecting at least one candidate enrolled image from among the set number of candidate enrolled images, the set number of candidate enrolled images corresponding to fingerprint templates; and matching the at least one candidate enrolled image to the query image.

5. The fingerprint recognition method of claim 4, wherein the information corresponding to the code comprises an index indicating the at least one candidate enrolled image.

6. The fingerprint recognition method of claim 4, wherein each candidate enrolled image corresponds to a partial fingerprint of a user.

7. The fingerprint recognition method of claim 1, wherein the verifying comprises:

detecting at least one candidate region in a fingerprint region of a user based on the set number of candidate regions; and matching the at least one candidate region to the query image.

8. The fingerprint recognition method of claim 7, wherein the information corresponding to the code comprises transition information and rotation information indicating the set number of candidate enrolled images.

9. The fingerprint recognition method of claim 7, wherein the fingerprint region of the user is generated through the set number of candidate enrolled images being stitched, and wherein each enrolled image corresponds to a portion of the fingerprint region.

10. The fingerprint recognition method of claim 1, wherein the query image is generated by capturing a portion of a fingerprint of a user.

11. A non-transitory computer-readable recording medium, when executed on a processor, configured to implement the method of claim 1.

12. The fingerprint recognition method of claim 1, wherein the obtaining obtains the information corresponding to the code from a same row of the code in the lookup table.

* * * * *